United States Patent
Griffiths et al.

(10) Patent No.: US 11,541,540 B2
(45) Date of Patent: Jan. 3, 2023

(54) METHOD AND APPARATUS FOR TRAJECTORY-PLANNING

(71) Applicant: Glowbuzzer Ltd, York (GB)

(72) Inventors: David Griffiths, Farnborough (GB); Alexander Kirkpatrick Kirkpatrick, Farnborough (GB); Angela Gibson, Farnborough (GB)

(73) Assignee: GLOWBUZZER LTD, York (GB)

( * ) Notice: Subject to any disclaimer, the term of this patent is extended or adjusted under 35 U.S.C. 154(b) by 168 days.

(21) Appl. No.: 16/893,813

(22) Filed: Jun. 5, 2020

(65) Prior Publication Data

US 2020/0384645 A1    Dec. 10, 2020

(30) Foreign Application Priority Data

Jun. 10, 2019   (GB) .................................. 1908281

(51) Int. Cl.
  *B25J 9/16*   (2006.01)
(52) U.S. Cl.
  CPC .......... *B25J 9/1664* (2013.01); *B25J 9/1633* (2013.01); *B25J 9/1651* (2013.01); *B25J 9/1661* (2013.01)
(58) Field of Classification Search
  CPC ...... B25J 9/1664; B25J 9/1633; B25J 9/1651; B25J 9/1661; G05B 19/416; G05B 2219/43062; G05B 2219/43104; G05B 2219/40121; G05B 2219/40454; G05B 2219/40519
  See application file for complete search history.

(56) References Cited

U.S. PATENT DOCUMENTS

| 9,981,381 B1* | 5/2018 | Nagarajan | B25J 9/1664 |
| 10,035,266 B1* | 7/2018 | Kroeger | B25J 9/1664 |
| 2013/0307459 A1* | 11/2013 | Tian | G05B 19/416 |
| | | | 318/570 |

FOREIGN PATENT DOCUMENTS

| WO | 0073967 A1 | 12/2000 | |
| WO | WO-0073967 A1 * | 12/2000 | ............ B25J 9/1664 |
| WO | 2009156069 A1 | 12/2009 | |

(Continued)

OTHER PUBLICATIONS

T. Kroger, A. Tomiczek and F.M. Wahl, "Online Trajectory Generation: Basic Concepts for Instantaneous Reactions to Unforseen Events," pp. 94-111 IEEE Transactions on Robotics, vol. 26, No. 1, Feb. 2010 (Year: 2010).*

(Continued)

*Primary Examiner* — Adam R Mott
*Assistant Examiner* — Elizabeth Rose Neleski
(74) *Attorney, Agent, or Firm* — Thomas Coester Intellectual Property

(57) ABSTRACT

A computer readable medium causing a computer to planning of a trajectory for an object that is capable of controlled movement in one or more degrees of freedom. At least one ordered sequence of movement profiles is obtained. The at least one ordered sequence includes: (i) movement profiles that end with a phase of increasing acceleration and (ii) movement profiles that end with a phase of decreasing acceleration. The ordered sequence is evaluated to select a movement profile capable of achieving a desired state of movement. The trajectory of the object is planned based on the selected movement profile.

16 Claims, 13 Drawing Sheets

(56) References Cited

FOREIGN PATENT DOCUMENTS

WO    WO-2009156069 A1 * 12/2009    ......... G05B 19/4163

OTHER PUBLICATIONS

Soon Yong Jeong, Yun Jong Choi, Poogyeon Park, Seung Gap Choi, "Jerk Limited Velocity Profile Generation For High Speed Industrial Robot Trajectories", IFAC Proceedings Volumes, vol. 38, Issue 1, 2005, pp. 595-600.

T. Kroger, A. Tomiczek and F. M. Wahl, "Towards On-Line Trajectory Computation," 2006 IEEE/RSJ International Conference on Intelligent Robots and Systems, Beijing, 2006, pp. 736-741, doi: 10.1109/IROS.2006.282622.

R. Haschke, E. Weitnauer and H. Ritter, "On-line planning of time-optimal, jerk-limited trajectories," 2008 IEEE/RSJ International Conference on Intelligent Robots and Systems, Nice, 2008, pp. 3248-3253, doi: 10.1109/IROS.2008.4650924.

Pontryagin's maximum principle: https://en.wikipedia.org/w/index.php?title=Pontryagin%27s_maximum_principle&oldid=841693261.

Patents Act 1977: Search Report under Section 17(5), dated Nov. 21, 2019.

T. Kroger, A. Tomiczek and F. M. Wahl, "Online Trajectory Generation: Basic Concepts for Instantaneous Reactions to Unforeseen Events," pp. 94-111 IEEE Transactions on Robotics, vol. 26, No. 1, Feb. 2010.

* cited by examiner

METHOD AND APPARATUS FOR TRAJECTORY-PLANNING

FIELD OF THE INVENTION

This invention relates to a controller and a method for planning a trajectory for an object that is capable of controlled movement in one or more degrees of freedom. It is particularly relevant to planning time-optimal, jerk-limited trajectories, for example for robots.

BACKGROUND OF THE INVENTION

A fundamental problem in robotics is how to calculate the best trajectory for a robot to follow, to move a part, tool, end effector, or other object from a current or starting position to a target position. In many scenarios, it is desirable to plan a smooth trajectory, in order to minimise forces or torques acting on actuators or motors, and reduce wear on mechanical components. At the same time, it is typically necessary to respect certain motion constraints, for the planned trajectory to be physically realisable and acceptable. These constraints may include velocity limits and acceleration limits in each degree of freedom. They may be fixed constraints of the system, or they may be different at different times, for different tasks. (For example, the maximum acceptable velocity and/or acceleration when transporting a full cup of coffee might be lower than when transporting an empty cup.)

Further complications can arise if the starting/ending velocity and/or acceleration are nonzero at the starting position and time.

It is often desirable to synchronise the motion in the various degrees of freedom. At the same time, it is also often desirable to complete the motion in the minimum time possible. This implies that the motion trajectory for each degree of freedom should be synchronised with the minimum time trajectory for the slowest degree of freedom—that is, the degree of freedom that takes the longest minimum time to achieve its target position.

All of these considerations lead to a difficult optimisation problem, to plan the best trajectory that meets all of the requirements. To make matters even more challenging, it would be desirable to be able to plan trajectories in real time—that is, it would be desirable to be able to recalculate the trajectory "on-line", while the robot is following an existing trajectory, in response to input of a new target position (or some other event).

SUMMARY OF THE INVENTION

The invention is defined by the claims. According to one aspect, there is provided a computer-implemented method of planning a trajectory for an object that is capable of controlled movement in one or more degrees of freedom, the method comprising:
  obtaining a starting state of motion of the object;
  obtaining a target state of motion for the object;
  obtaining one or more motion constraints;
  obtaining at least one ordered sequence of movement profiles,
  wherein the at least one ordered sequence of movement profiles includes:
    (i) movement profiles that end with a phase of increasing acceleration and
    (ii) movement profiles that end with a phase of decreasing acceleration;
  evaluating the at least one ordered sequence of movement profiles to determine whether they can achieve the target state of motion;
  selecting a movement profile according to the result of the evaluating; and
  planning the trajectory for the object based on the selected movement profile.

Movement profiles that end with a phase of increasing acceleration are also referred to herein as "positive" profiles. Movement profiles that end with a phase of decreasing acceleration are also referred to herein as "negative" profiles. The use of at least one ordered sequence of movement profiles, comprising multiple positive profiles and multiple negative profiles can bring several advantages. By obtaining and using an ordered sequence of profiles, the need to design and use complicated decision trees can be avoided, for example. It may be easier to construct an ordered sequence in a logical, principled way, than it would be to identify an arbitrary set of movement profiles to evaluate. Likewise, it may be easier to test and validate the ordered sequence, to guarantee that no relevant movement profiles have been omitted.

Including both positive and negative profiles in the at least one ordered sequence can enable the method to successfully find solutions for a wider range of starting and target states of motion. For example, the method may be able to find solutions for scenarios in which the target velocity is non-zero at the target position. Moreover, the method may be able to find solutions for scenarios in which the target position is not a fixed position, but a position that varies as a function of time. The method may also be able to find multiple solutions and correctly identify the minimum time solution, as well as identifying time-ranges for which no solution is possible. In this context, finding a "solution" refers to finding a movement profile that is capable of achieving the desired target state and preferably determining the parameters of that profile that will actually achieve the target state.

Each movement profile may consist of a plurality of phases, each phase being characterised by an acceleration function and a respective time interval in which that acceleration function is applied. At least some of the time intervals have nonzero duration. Each phase may be associated with acceleration of a given rate of change. The acceleration in any given phase may be one of three different types: increasing, decreasing, and constant acceleration.

The movement profiles may be time-optimal, jerk-limited movement profiles, which achieve the target state of motion in the shortest possible amount of time (within the motion constraints) or time-specified movement profiles, which achieve the target state of motion at a specified time. In both cases, acceleration is preferably a piecewise linear function of time. In this case, each phase may be associated with a linearly increasing acceleration (constant positive jerk), linearly decreasing acceleration (constant negative jerk), or constant acceleration (zero jerk).

The starting state of motion may comprise, for each degree of freedom, a starting position, a starting velocity, and a starting acceleration. The target state of motion may comprise, for each degree of freedom, a target position, a target velocity, and a target acceleration. The target acceleration may be zero. The target velocity may be nonzero.

The one or more motion constraints may comprise for each degree of freedom, at least one velocity limit, at least one acceleration limit, and at least one jerk limit.

The evaluating may comprise: identifying the minimum amount of time in which it is possible to achieve the target state of motion, and identifying the movement profile that achieves this; and/or identifying the start and end of a range of times in which it is impossible to achieve the target state of motion, and identifying the one or more movement profiles associated with this range of times.

Obtaining the at least one ordered sequence of movement profiles optionally comprises: defining one or more initial candidate movement profiles, based on a difference between the starting state of motion and the target state of motion, and based on the one or more motion constraints, and starting with the one or more initial candidate movement profiles, generating the at least one ordered sequence by successive modification.

In some embodiments, the starting state of motion includes a starting velocity; the target state of motion includes a target velocity; the one or more motion constraints include a positive velocity limit; and the one or more initial candidate movement profiles comprise a maximal positive movement profile that takes a velocity of the object from the starting velocity to the positive velocity limit and then reduces it to the target velocity.

In some embodiments, the starting state of motion includes a starting velocity; the target state of motion includes a target velocity; the one or more motion constraints include a negative velocity limit; and the one or more initial candidate movement profiles comprise a maximal negative movement profile that takes a velocity of the object from the starting velocity to the negative velocity limit and then increases it to the target velocity.

In some embodiments, the starting state of motion includes a starting velocity; the target state of motion includes a target velocity; and the one or more initial candidate movement profiles comprise a minimal profile that takes a velocity of the object from the starting velocity to the target velocity in the minimum amount of time.

The one or more motion constraints may include a positive velocity limit and a negative velocity limit. When starting with the maximal positive movement profile, which achieves the positive velocity limit, the successive modification may terminate with a maximal negative movement profile that achieves the negative velocity limit. Conversely, when starting with the maximal negative movement profile, which achieves the negative velocity limit, the successive modification may terminate with a maximal positive movement profile that achieves the positive velocity limit.

Alternatively, the one or more initial candidate movement profiles may comprise both the maximal positive movement profile and the maximal negative movement profile. In this case, the successive modification may comprise: a first successive modification that starts from the maximal positive movement profile; and a second successive modification that starts from the maximal negative movement profile.

Each of the first and second successive modifications may terminate when a minimal profile is reached. The minimal profile is the profile that achieves the target velocity and target acceleration in the minimum amount of time (ignoring the target position). The minimal profile may consist of one, two, or three acceleration phases that maximise the magnitude of the acceleration, while satisfying the target velocity and target acceleration, and while meeting the motion constraints (velocity, acceleration, and jerk limits).

The one or more initial candidate movement profiles may comprise a maximal positive movement profile comprising or consisting of seven phases, being: a first phase of increasing acceleration, in a first time interval; a second phase of constant positive acceleration, in a second time interval; a third phase of decreasing acceleration in which acceleration is positive, in a third time interval; a fourth phase of zero acceleration, in a fourth time interval; a fifth phase of decreasing acceleration in which acceleration is negative, in a fifth time interval; a sixth phase of constant negative acceleration, in a sixth time interval; and a seventh phase of increasing acceleration in which acceleration is negative, in a seventh time interval, wherein at least two, three, four, five, six or all seven of the time intervals have nonzero duration.

The first, second, and third phases may be chosen so as to take the object to the positive velocity limit. The fifth, sixth, and seventh phases may be chosen so as to take the object from the positive velocity limit to the target velocity.

The one or more initial candidate movement profiles may comprise a maximal negative movement profile comprising or consisting of seven phases, being: a first phase of decreasing acceleration, in a first time interval; a second phase of constant negative acceleration, in a second time interval; a third phase of increasing acceleration in which acceleration is negative, in a third time interval; a fourth phase of zero acceleration, in a fourth time interval; a fifth phase of increasing acceleration in which acceleration is positive, in a fifth time interval; a sixth phase of constant positive acceleration, in a sixth time interval; and a seventh phase of decreasing acceleration in which acceleration is positive, in a seventh time interval, wherein at least two, three, four, five, six or all seven of the time intervals have nonzero duration.

The first, second, and third phases may be chosen so that they take the object to the negative velocity limit. The fifth, sixth, and seventh phases may be chosen so that they take the object from the negative velocity limit to the target velocity.

Optionally, each movement profile consists of a plurality of phases, wherein the successive modification comprises a series of stages, and wherein each stage comprises shortening or lengthening the current movement profile, while ensuring that the target velocity is achieved, until one or both of the following occurs: one of the one or more motion constraints is encountered; and the number of phases that have nonzero duration changes.

The successive modification may comprise: if the current profile includes one or more phases of positive acceleration and one or more phases of negative acceleration, shortening the current profile by shortening the one or more phases of positive acceleration and shortening the one or more phases of negative acceleration; or otherwise, if the current profile consists of a plurality of phases of acceleration having the same sign, shortening the current profile by shortening one or more early phases of acceleration and lengthening one or more late phases of acceleration.

These kinds of modification may be performed, for example, if the current profile ends with a phase of increasing acceleration. They may be performed, in particular, when starting with a maximal positive movement profile, as summarised above.

The phases of acceleration having the same sign may be phases of negative acceleration.

The successive modification may comprise: if the current profile consists of a plurality of phases of acceleration having the same sign, lengthening the current profile by shortening a late phase of acceleration and lengthening an early phase of acceleration; or otherwise, if the current profile includes one or more phases of positive acceleration and one or more phases of negative acceleration, lengthening the current profile by lengthening the one or more phases of positive acceleration and lengthening the one or more phases of negative acceleration.

These kinds of modification may be performed, for example, if the current profile ends with a phase of decreasing acceleration. They may be performed, in particular, when having started with a maximal positive movement profile, as summarised above.

The phases of acceleration having the same sign may be phases of positive acceleration.

Preferably, the target state of motion includes a target velocity, the starting state of motion includes a starting velocity, and the successive modification comprises, when lengthening or shortening the current profile, lengthening or shortening the phases of the current profile in a balanced way so as to maintain a difference between the starting velocity and the target velocity.

Shortening may comprise decreasing the length of an existing phase or eliminating an existing phase. Lengthening may comprise increasing the length of an existing phase or adding one or more additional phases.

The at least one ordered sequence of movement profiles is preferably ordered by the travelling time that is achieved by each profile.

Ordering by travelling time means that the shortest travelling time achieved by one profile is equal to the longest travelling time achieved by the adjacent profile in the ordered sequence. Note that the ordered sequence need not be monotonically increasing or decreasing. In particular, the travelling time may decrease from the maximal positive movement profile to the minimal profile. It may then increase again from the minimal profile to the maximal negative movement profile.

Typically, the at least one ordered sequence is generated by successive modification, as summarised above.

The travelling time that is achieved using a given movement profile is the sum of the time intervals of its constituent phases.

The target state of motion may include a target position, and the evaluating may comprise, for each movement profile in the at least one ordered sequence: identifying the shortest travelling time that can be achieved using the movement profile; identifying the longest travelling time that can be achieved using the movement profile; defining a first range between the shortest travelling time and the longest travelling time; calculating a first final position, being the final position achieved by the movement profile corresponding to the shortest travelling time; calculating a second final position, being the final position achieved by the movement profile corresponding to the longest travelling time; and determining whether the movement profile can provide one or more solutions for achieving the target state of motion, within the first range, based on the first final position, the second final position, and the target position.

The at least one ordered sequence of movement profiles may be ordered by travelling time; and the longest travelling time that can be achieved using a given movement profile may be equal to the shortest travelling time that can be achieved using the next longer movement profile in the at least one ordered sequence.

Likewise, the shortest travelling time that can be achieved using a given movement profile is preferably equal to the longest travelling time that can be achieved using the next shorter movement profile in the at least one ordered sequence.

In the same way, preferably, the first final position achieved by a given movement profile is equal to the second final position achieved by the next shorter movement profile in the at least one ordered sequence; and the second final position achieved by a given movement profile is equal to the first final position achieved by the next longer movement profile in the at least one ordered sequence.

The evaluating preferably comprises evaluating each movement profile in the at least one ordered sequence. By reusing the shortest/longest travelling times (and first/second final positions), for adjacent movement profiles in the at least one ordered sequence, unnecessary duplication of calculations can be avoided.

The determining may comprise detecting that the first final position undershoots the target position and the second final position overshoots the target position and, in response, identifying that the respective movement profile provides at least one solution within the first range.

The method may further comprise numerically solving the final position function in the first range, to calculate the at least one solution. The solving may comprise using the Newton-Raphson method, for example. The solving may be expressed as finding the travelling time for which the position achieved is equal to the target position. Likewise, the solving may be expressed as finding the travelling time for which a difference between the position achieved and the target position is zero.

The determining may comprise: defining a final position function, describing the final position achieved by the movement profile as a function of the travelling time; defining a gradient function, based on the gradient of the final position function with respect to travelling time; calculating a first gradient value, being the value of the gradient function corresponding to the shortest travelling time; calculating a second gradient value, being the value of the gradient function corresponding to the longest travelling time; and checking whether the respective movement profile can provide one or more solutions for achieving the target state of motion, based on the first gradient value, the second gradient value, the first final position, the second final position, and the target position.

The process of successive modification, summarised above, can ensure that the final position function for a given movement profile has at most one local extremum.

The checking may comprise detecting an extremum in the final position function, the method further comprising, in response to said detecting: splitting the first range into a second range and a third range based on the detected extremum; and numerically solving the final position function in at least one of: the second range and the third range.

The method preferably comprises, before numerically solving the final position function, determining whether the movement profile can provide a solution for achieving the target state of motion, within the second range and/or the third range. The determining may comprise: detecting that a third final position, corresponding to the shortest travelling time in the respective range, undershoots the target position; and detecting that a fourth final position, corresponding to the longest travelling time in the respective range, overshoots the target position.

The numerical solving may find a solution for achieving the target state of motion. The solving may comprise using the Newton-Raphson method, for example.

In some embodiments, the evaluating comprises identifying a movement profile that achieves the target state of motion at a specified time, wherein the at least one ordered sequence of movement profiles includes a plurality of movement profiles each comprising or consisting of one of the two following sequences of seven phases: Sequence A: a first phase of increasing acceleration in a first time interval, a second phase of constant acceleration in a second time interval, a third phase of decreasing acceleration in a third time interval, a fourth phase of constant acceleration in a fourth time interval, a fifth phase of decreasing acceleration in a fifth time interval, a sixth phase of constant acceleration in a sixth time interval, and a seventh phase of increasing acceleration in a seventh time interval; and Sequence B: a first phase of decreasing acceleration in a first time interval, a second phase of constant acceleration in a second time interval, a third phase of increasing acceleration in a third time interval, a fourth phase of constant acceleration in a fourth time interval, a fifth phase of increasing acceleration in a fifth time interval, a sixth phase of constant acceleration in a sixth time interval, and a seventh phase of decreasing acceleration in a seventh time interval, wherein the acceleration is a piecewise linear function of time and the fourth time interval has nonzero duration.

The fourth time interval is preferably chosen so as to make the sum of all time intervals equal to the specified time.

Alternatively, the fourth time interval may be chosen so that the final position achieved by the movement profile is equal to the target position. In this case, the evaluating may comprise identifying the shortest travelling time that can be achieved using the movement profile; identifying the longest travelling time that can be achieved using the movement profile; and determining whether the movement profile can provide one or more solutions for achieving the target state of motion, wherein the determining comprises detecting that the specified time is between the shortest travelling time and the longest travelling time of the profile and, in response, identifying that the respective movement profile provides a solution for the specified time. In this regard, the inventors have recognised that movement profiles for achieving the target state of motion at a specified time lead to functions of final position with respect to travelling time that are strictly monotonic decreasing—therefore, only one solution is possible.

Optionally, the at least one ordered sequence of movement profiles additionally comprises a plurality of movement profiles, each comprising or consisting of one of the two following sequences of seven phases: Sequence C: a first phase of increasing acceleration in a first time interval, a second phase of constant acceleration in a second time interval, a third phase of decreasing acceleration in a third time interval, a fourth phase of constant acceleration in a fourth time interval, a fifth phase of increasing acceleration in a fifth time interval, a sixth phase of constant acceleration in a sixth time interval, and a seventh phase of decreasing acceleration in a seventh time interval; and Sequence D: a first phase of decreasing acceleration in a first time interval, a second phase of constant acceleration in a second time interval, a third phase of increasing acceleration in a third time interval, a fourth phase of constant acceleration in a fourth time interval, a fifth phase of decreasing acceleration in a fifth time interval, a sixth phase of constant acceleration in a sixth time interval, and a seventh phase of increasing acceleration in a seventh time interval, wherein the acceleration is a piecewise linear function of time and the fourth time interval has nonzero duration.

Sequence C defines a "double acceleration" profile. Sequence D defines a "double deceleration" profile. Preferably, the at least one ordered sequence comprises: at least three double acceleration profiles; or at least three double deceleration profiles.

The fourth time interval is preferably chosen so as to make the sum of all time intervals equal to the specified time.

The additional movement profiles can be introduced in the at least one ordered sequence, by successive modification, after the movement profile that transfers the object from the starting state of motion to the target velocity and acceleration in the minimum time (ignoring the duration of the fourth phase and without regard to the target position). The successive modification may be achieved by shortening an early phase of acceleration and lengthening a late phase of acceleration (Sequence C), or lengthening an early phase of acceleration and shortening a late phase of acceleration (Sequence D). The modification continues until it is not possible to shorten or lengthen further. The profile reached with this method is now suitable for further successive modification as already summarised above (see claim 9).

The successive modification preferably follows the method of claim 7. It is possible during this process that the fourth time interval would have to become negative, to accommodate the changes in the other phases. To avoid this, a further profile may be introduced, wherein phases two and three, or phases five and six, are made zero duration and the fourth phase has nonzero acceleration.

In some embodiments, the target state of motion comprises a target position, wherein the target position is a time-varying function.

For example, the target position may be moving with constant velocity.

The method may comprise defining a position-difference function, describing a difference between the time varying function and the final position achieved by the movement profile as a function of the travelling time. The method may comprise determining whether a given movement profile can provide one or more solutions for achieving the target state of motion, based on the position-difference function.

The method may further comprise numerically solving the position-difference function, to calculate the at least one solution. The solving may comprise using the Newton-Raphson method, for example, as already noted above.

The method may further comprise controlling the object to follow the planned trajectory.

Also provided is a computer program comprising computer program code configured to cause one or more physical computing devices to perform a method as summarised above, when said computer program is run on the one or more physical computing devices. The computer program is preferably stored on a non-transitory computer-readable medium.

According to another aspect, there is provided a controller for planning a trajectory for an object that is capable of controlled movement in one or more degrees of freedom, the controller comprising:
  one or more inputs, configured to:
  receive a starting state of motion of the object; and
  receive a target state of motion for the object;
  one or more processors, configured to:
  obtain one or more motion constraints,
  obtain at least one ordered sequence of movement profiles,
wherein the at least one ordered sequence of movement
  profiles includes: (i)
movement profiles that end with a phase of increasing
  acceleration and (ii)
movement profiles that end with a phase of decreasing
  acceleration;
  evaluate the at least one ordered sequence of movement
    profiles to determine whether they will achieve the
    target state of motion;
  select a movement profile according to the result of the
    evaluating; and
  plan the trajectory for the object based on the selected
    movement profile, and at least one output, configured to output the planned trajectory.

The output of the controller may output the trajectory to an actuator that is configured to move the object, so that the object follows the planned trajectory.

Also provided is a computer-implemented method of planning a trajectory for an object that is capable of controlled movement in one or more degrees of freedom, the method comprising:

obtaining a starting state of motion of the object;

obtaining a target state of motion of the object, wherein the target state of motion comprises a velocity that is non-zero;

obtaining one or more motion constraints;

obtaining at least one ordered sequence of movement profiles;

evaluating the at least one ordered sequence of movement profiles to determine whether they will achieve the target state of motion;

selecting a movement profile according to the result of the evaluating; and planning the trajectory for the object based on the selected movement profile.

According to still another aspect, there is provided a computer-implemented method of planning a trajectory for an object that is capable of controlled movement in one or more degrees of freedom, the method comprising:

obtaining a starting state of motion of the object;

obtaining a target state of motion of the object;

obtaining one or more motion constraints;

defining a plurality of candidate movement profiles, each candidate movement profile being described by a set of parameters;

for each of the plurality of candidate movement profiles:
defining a set of equations of motion, the set of equations including the starting state of motion and the target state of motion as known variables, the set of equations further including the set of parameters of the candidate movement profile as unknown variables;
solving the respective set of equations of motion, to produce a solution; and
checking whether the solution meets the one or more motion constraints, the method further comprising identifying at least one movement profile that meets each of the one or more motion constraints, and planning the trajectory based on the identified at least one movement profile.

A movement profile that meets each of the one or more motion constraints has an associated travelling time. The method may comprise identifying more than one movement profile that meets the motion constraints, and selecting, among the identified movement profiles, the movement profile that has the shortest travelling time. The method may further comprise planning the trajectory based on the selected movement profile.

BRIEF DESCRIPTION OF THE DRAWINGS

The invention will now be described by way of example with reference to the accompanying drawings, in which.

Figure 1:
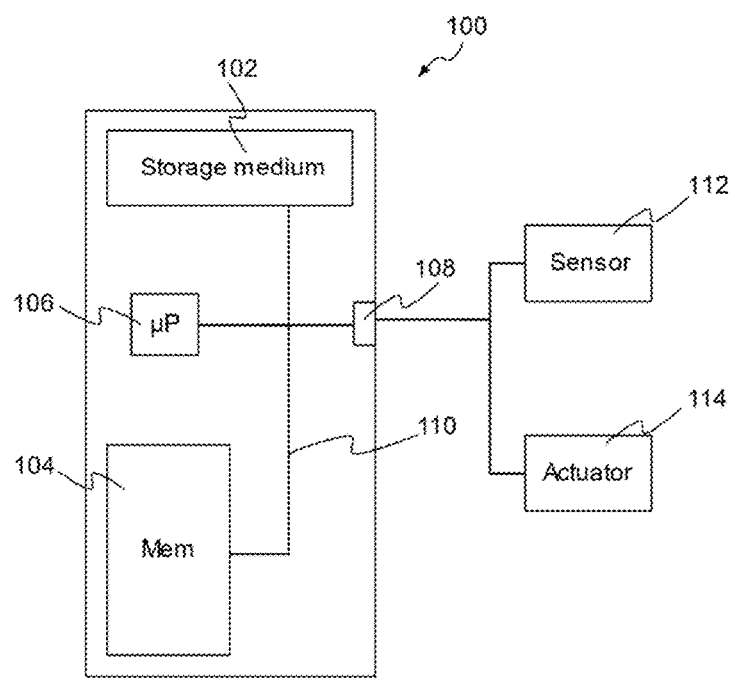
FIG. 1 is a schematic block diagram of a computer system configured to implement an embodiment of the invention.

It should be noted that these figures are diagrammatic and not drawn to scale. Relative dimensions and proportions of parts of these figures have been shown exaggerated or reduced in size, for the sake of clarity and convenience in the drawings.

DETAILED DESCRIPTION

FIG. 1 of the accompanying drawings schematically illustrates an exemplary computer system 100. This computer system may be configured as a controller according to an embodiment of the invention, and/or may be configured to carry out a method according to an embodiment. The exemplary computer system 100 comprises a computer-readable storage medium 102, a memory 104, a processor 106 and one or more interfaces 108, which are all linked together over one or more communication busses 110. The exemplary computer system 100 may take the form of a conventional computer system, such as, for example, a desktop computer, a personal computer, a laptop, a tablet, a smart phone, a smart watch, a virtual reality headset, a server, a mainframe computer, and so on. Alternatively, it may take the form of an embedded controller, for example in a robotics system, or a guidance system, for example for a land-going or sea-going vehicle, an aircraft or spacecraft, a missile, or other machine capable of controlled movement.

The computer-readable storage medium 102 and/or the memory 104 may store one or more computer programs (or software or code) and/or data. The computer programs stored in the computer-readable storage medium 102 may include an operating system for the processor 106 to execute in order for the computer system 100 to function. The computer programs stored in the computer-readable storage medium 102 and/or the memory 104 may include computer programs according to embodiments of the invention or computer programs that, when executed by the processor 106, cause the processor 106 to carry out a method according to an embodiment of the invention The processor 106 may be any data processing unit suitable for executing one or more computer readable program instructions, such as those belonging to computer programs stored in the computer-readable storage medium 102 and/or the memory 104. As part of the execution of one or more computer-readable program instructions, the processor 106 may store data to and/or read data from the computer-readable storage medium 102 and/or the memory 104. The processor 106 may comprise a single data processing unit or multiple data processing units operating in parallel or in cooperation with each other. The processor 106 may, as part of the execution of one or more computer readable program instructions, store data to and/or read data from the computer-readable storage medium 102 and/or the memory 104.

The one or more interfaces 108 may comprise a network interface enabling the computer system 100 to communicate with other computer systems across a network (not shown). The network may be any kind of network suitable for transmitting or communicating data from one computer system to another. For example, the network could comprise one or more of a local area network, a wide area network, a metropolitan area network, the internet, a wireless communications network, and so on. The computer system 100 may communicate with other computer systems over the network via any suitable communication mechanism/protocol. The processor 106 may communicate with the network interface via the one or more communication busses 110 to cause the network interface to send data and/or commands to another computer system over the network. Similarly, the one or more communication busses 110 enable the processor 106 to operate on data and/or commands received by the computer system 100 via the network interface from other computer systems over the network.

The one or more interfaces 108 may alternatively or additionally comprise a user input interface and/or a user output interface. The user input interface may be arranged to receive input from a user, or operator, of the system 100. The user may provide this input via one or more user input devices (not shown), such as a mouse (or other pointing device, track-ball or keyboard. The user output interface may be arranged to provide a graphical/visual output to a user or operator of the system 100 on a display (or monitor or screen) (not shown). The processor 106 may instruct the user output interface to form an image/video signal which causes the display to show a desired graphical output. The display may be touch-sensitive enabling the user to provide an input by touching or pressing the display.

The one or more interfaces 108 may comprise a control input interface and/or a control output interface. The control input interface may be configured to receive command inputs, such as a target state of motion, from a user or from another device. The control output interface may provide an interface to one or more actuators 114. The control output interface may be configured to provide control outputs to one or more actuators 114. These control outputs may comprise a trajectory planned according to an embodiment, or they may comprise control outputs derived from the planned trajectory, which cause the actuator to implement the planned trajectory. The one or more actuators 114 may be configured to move the object and thereby cause the object to follow a trajectory planned according to an embodiment.

According to some embodiments, the one or more interfaces 108 may comprise an interface to one or more sensors 112. The one or more sensors 112 may be configured to provide sensed data that describes a current state of motion of an object—for example, a current position, velocity, and/or acceleration of the object.

Figure 2:
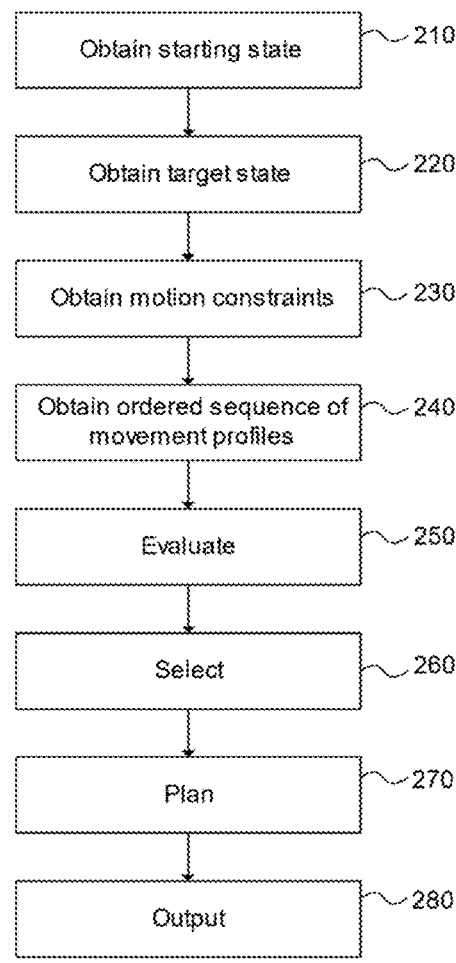
FIG. 2 is a flowchart illustrating a method of planning a trajectory for an object according to an embodiment.

FIG. 2 illustrates an example of a computer-implemented method of planning a trajectory for an object. The object is capable of controlled movement in at least one, and preferably more than one, degree of freedom. In this example, the object is an end effector of a robotic arm. (However, it will be understood that the scope of the invention is not limited to this.) In this case, each link in the robotic arm may correspond one degree of freedom. Alternatively, the degrees of freedom in which the end effector may be moved could be defined in a Cartesian coordinate system.

The method of FIG. 2 may be implemented by the computer system 100 of FIG. 1. In this context, the computer system 100 operate as a controller for planning a trajectory. In step 210, a starting state of motion is obtained by the computer system 100 via the one or more interfaces 108. The starting state of motion may be received from the one or more sensors 112, which measure the current position, velocity, and acceleration of the object. The starting state therefore comprises a starting position, starting velocity, and starting acceleration of the object. In step 220, the computer system 100 obtains a target state of motion. The target state of motion may be received via the one or more interfaces 108—for example, from a user via a user interface, or as a command input received via a control interface. Like the starting state, the target state typically comprises a target position, velocity and acceleration for the object. In the examples below, it will be assumed that the target acceleration is zero; however, the methods described are applicable more generally to nonzero target accelerations. The target velocity can also be nonzero. This can lead to inoperative time periods—ranges of travelling time in which no movement profile can achieve the target state. Methods according to the embodiments described herein can correctly identify these inoperative periods, as well as finding the shortest time solution.

In step 230, the processor 106 obtains motion constraints. In the present example, the motion constraints include a positive velocity limit, negative velocity limit, positive acceleration limit, negative acceleration limit, positive jerk limit, and negative jerk limit (where jerk is the derivative of acceleration with respect to time). These constraints may be based on physical limitations of the robotic system or they may be limits that have been imposed for a particular task, operation, or application. If the constraints are based on physical limitations of the robotic system, the processor 106 may obtain them from the storage medium 102. If they are task-specific, then they may be obtained together with the target state of motion, for example.

In step 240, the processor 106 obtains at least one ordered sequence of movement profiles. In step 250, the processor 106 evaluates these movement profiles, to determine whether they are able to achieve the target state of motion. In step 260, the processor selects one of the movement profiles, based on the result of the evaluation in step 250. In step 270, the processor 106 plans the trajectory for the object using the selected movement profile. The computer system then outputs the planned trajectory, via the one or more interfaces 108. In particular, the planned trajectory is output to the one or more actuators 114, which can then move the object to follow the planned trajectory.

The task of the trajectory-planning algorithm is: given the current/starting state of motion, and the motion constraints, to generate the correct movement profile to achieve the target state of motion (position and velocity) either (a) in the minimum amount of time or (b) at a specified time.

A canonical movement profile consists of seven phases, corresponding to seven stages of motion. The motion profiles explained below are jerk-limited profiles; therefore, they consist of piecewise linear phases of acceleration. The maximum positive slope of the acceleration function is determined by the positive jerk limit; and the maximal negative slope of the acceleration function is determined by the negative jerk limit. The first three phases (or "head") of a canonical "positive" profile consist of a first phase of increasing acceleration in a first time interval, a second phase of constant acceleration in a second time interval, and a third phase of decreasing acceleration in a third time interval. This is sometimes labelled herein as a "PosThree" ("positive three-phase") part of the profile. The final three phases (or "tail") of a canonical positive profile consist of a fifth phase of decreasing acceleration in a fifth time interval, a sixth phase of constant acceleration in a sixth time interval, and a seventh phase of increasing acceleration in a seventh time interval. This is also referred to as a "NegThree" ("negative three-phase") part of the profile. In between the head and the tail, there may be a fourth phase of constant acceleration in a fourth time interval. This is often a phase of constant zero acceleration; therefore, it represents a cruise at constant velocity. The canonical "negative" profile is an inverted canonical positive profile—or equivalently, a reversed canonical positive profile with the head and the tail swapped.

An exemplary process for obtaining 240 the at least one ordered sequence of movement profiles will now be described in greater detail, with reference to FIG. 3. The process starts by defining at least one initial candidate movement profile, step 242. This is followed by a process of successive modification. Starting with the initial candidate movement profile, the current movement profile is lengthened or shortened (step 244) to generate the next movement profile, until all of the movement profiles in the ordered sequence have been obtained.

In the present example, the initial candidate movement profile is a maximal positive movement profile, which takes the velocity of the object from the starting velocity to the positive velocity limit and then reduces it to the target velocity. In many cases, this will require one or more phases of positive acceleration at the head of the profile, and one or more phases of negative acceleration that they tail of the profile. However, this depends on the relationships between the starting velocity, the positive velocity limit, and the target velocity. Note that the maximal positive movement profile is defined without reference to the target position—it may undershoot or overshoot the target position. If it undershoots the target position, then the solution can be found by adding a cruise in the fourth phase until the target position is achieved.

Assuming the maximal positive movement profile overshoots the target position, the process 240 of obtaining the ordered sequence of movement profiles proceeds by modifying the maximal positive profile, successively. At each stage, the next profile is generated according to the following rules:

If the profile is positive and trimming is possible, then trim equal area from under the head and the tail of the acceleration function;

If the profile is positive and trimming is not possible, then shift area from the head to the tail of the acceleration function;

When the minimal profile is reached (that is, the profile consists of a head or tail only), then flip the head and tail to create the initial negative profile. That is, re-label the final three phases of the positive profile as the first three phases of the negative profile;

If the profile is negative and adding is not possible, then shift area from the tail to the head;

If the profile is negative and adding is possible, add equal area to the head and the tail.

A positive profile is one generated after the initial candidate movement profile but before a minimal 3-phase profile is reached. A negative profile is one generated after the minimal profile. A minimal profile is one that brings the velocity and acceleration from the starting state to the target state in as short a time as possible (without regard to target position). "Adding" and "trimming" are possible when the profile includes phases of positive acceleration and phases of negative acceleration. In this case, area can be added or removed equally in the positive and negative parts, thus preserving the net change in velocity. (This net change in velocity is equal to the difference between the starting velocity and the target velocity.)

Specific examples of the above rules in action will now be described with reference to FIGS. 4 to 9.

Figure 4A:
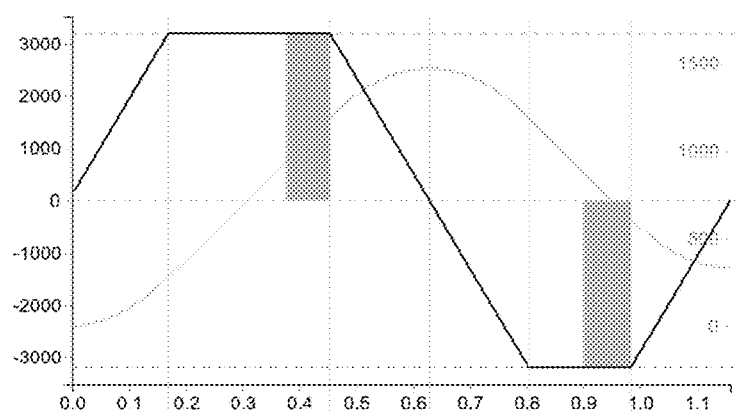
FIGS. 4A-4D show examples of how to shorten positive profiles for which trimming is possible.

FIG. 4A shows a first example of a positive movement profile for which trimming is possible. The solid black line is the acceleration function (scale shown on the left hand side). The solid grey line is the velocity function (scale shown on the right hand side). Time is on the horizontal axis. In this case, we want to trim equal areas from head and tail. If we are trimming a shape with three phases in the head or tail (that is, a shape that reaches the positive or negative acceleration limit), then we want to reduce the head or tail as much as possible, possibly removing it completely. The profile in FIG. 4A has three phases in the head and the tail (PosThreeNegThree). To generate the next profile, the profile is shortened, by removing the shorter of the two constant-acceleration phases (the second and sixth phases), and decreasing the duration of the longer one by a corresponding amount. The area to be removed is indicated by the shaded rectangles in the graph. As can be seen, this will result in the duration of the sixth phase reducing to zero—that is, the phase of constant negative acceleration will be eliminated.

Figure 4B:
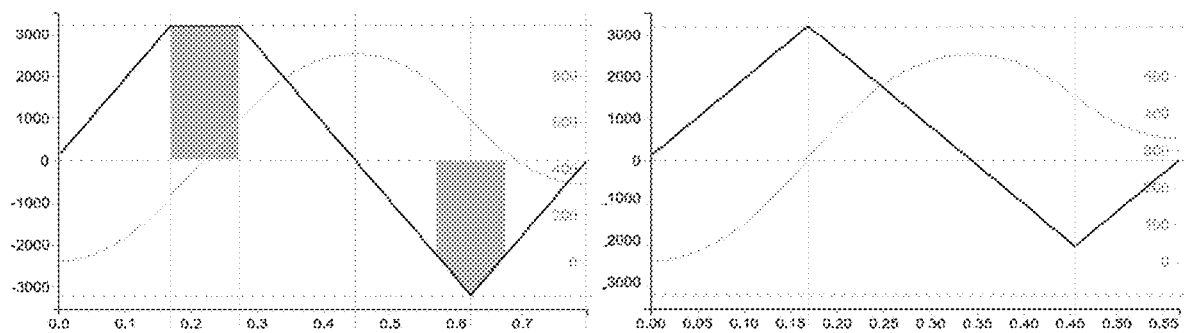

FIG. 4B shows a second example of a positive profile for which trimming is possible. The current profile is shown on the left. This profile has three phases in the head and two phases in the tail (PosThreeNegTwo). Here, the area under the tail is greater than the rectangular area under the second phase (of constant positive acceleration). Therefore, this rectangular area is removed and the tail is shortened correspondingly, without removing it completely. Again, the area to be removed in the shortening is indicated by shading. The result of the shortening is shown on the right.

Figure 4C:
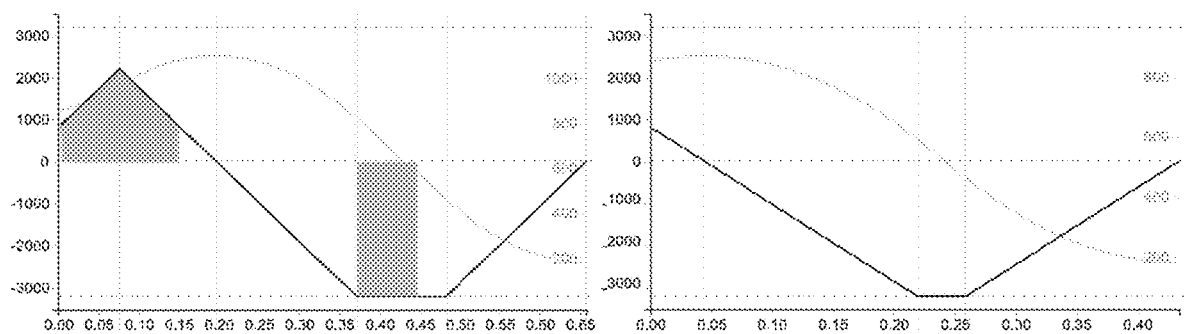

FIG. 4C shows a third example of a positive profile for which trimming is possible. This profile has two phases in the head and three in the tail. Here, the area under the two-phase head portion is smaller than the rectangular area under the constant-acceleration sixth phase in the tail. To shorten the profile, as much as possible of the head is removed, and the sixth phase is shortened accordingly. The result is shown on the right. Note that the head cannot be removed entirely, because of the nonzero starting acceleration.

The resulting profile, shown on the right hand side of FIG. 4C, is a minimal profile. It is the smallest positive shape that can be constructed in this case, because all of the area has already been shifted from the head to the tail (there are no positive phases one to three). The next step for this shape is to redefine it as a NegHeadThree—in other words, relabel phases five to seven of the positive profile as phases one to three of a negative profile. It will then be lengthened, according to the successive modification rules for negative profiles, until the maximal negative profile is reached.

Figure 4D:
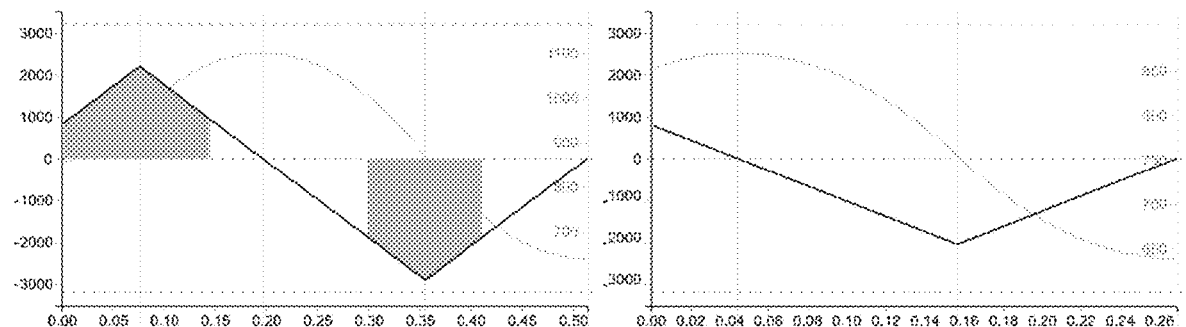

FIG. 4D shows a fourth example of a positive profile for which trimming is possible. This profile has two phases in the head and two in the tail. The smaller of the head and tail portions will be removed. Note that, as for FIG. 4C, it may not be possible to remove the entire head portion if the starting acceleration is nonzero.

Figure 5A:
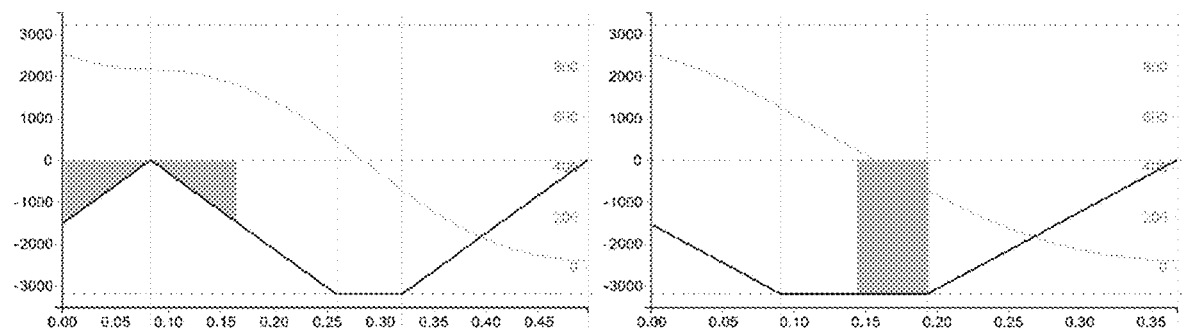
FIGS. 5A-5C show examples of how to shorten positive profiles for which trimming is not possible.

FIG. 5A shows a first example of a positive profile for which trimming is not possible. This profile has one phase in the head and three phases in the tail. Note that this situation can only arise if the starting acceleration is negative. Equal trimming of positive and negative portions is not possible because there is no "positive" area to remove. Instead, to shorten the profile, area is shifted from the head to the tail, increasing the rectangular area under the constant-acceleration sixth phase.

Figure 5B:
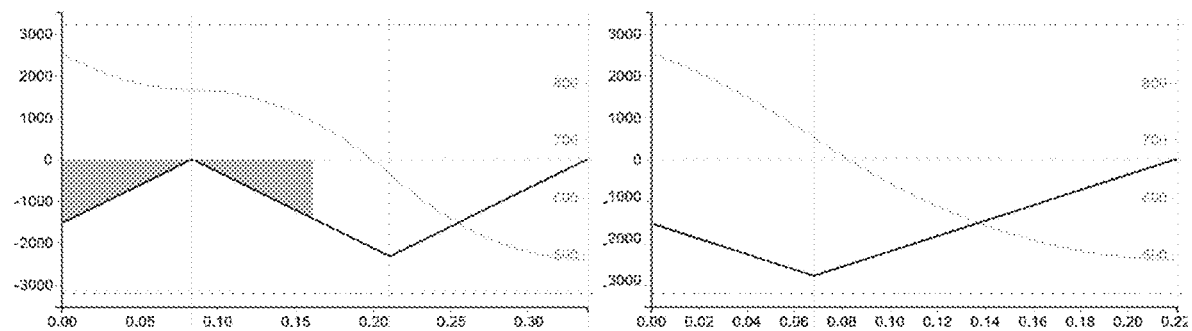
Figure 5C:
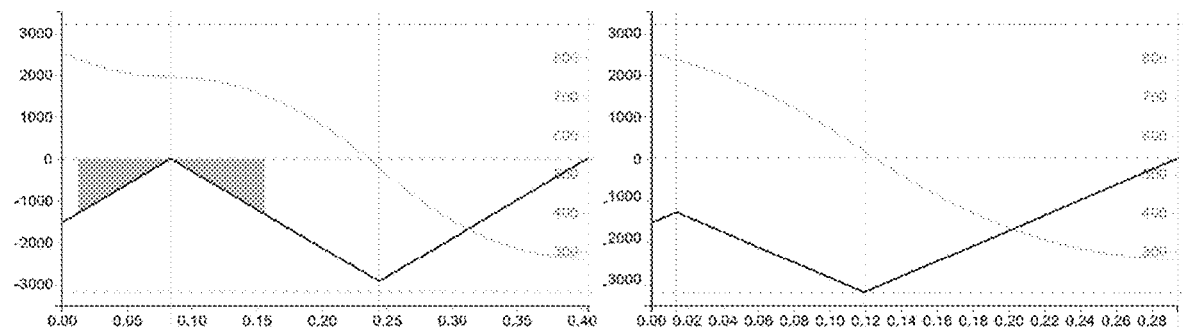

FIGS. 5B and 5C show second and third examples, respectively of positive profiles for which trimming is not possible. These profiles have one phase in the head and two phases in the tail. If the head portion moved to the tail still gives a two-phase tail portion (that is, without reaching the negative is acceleration limit) then we will shift the entire head portion to the tail, as shown in FIG. 5B. If the head portion when moved to the tail will require a TailThree (to avoid breaking the negative acceleration limit), then we will produce a PosOneNegTwo with the tail portion reaching the negative acceleration limit, as an intermediate step (see FIG. 5C). This is then treated as a PosOneNegThree as described above with reference to FIG. 5A, to produce a NegTailThree.

Figure 6A:
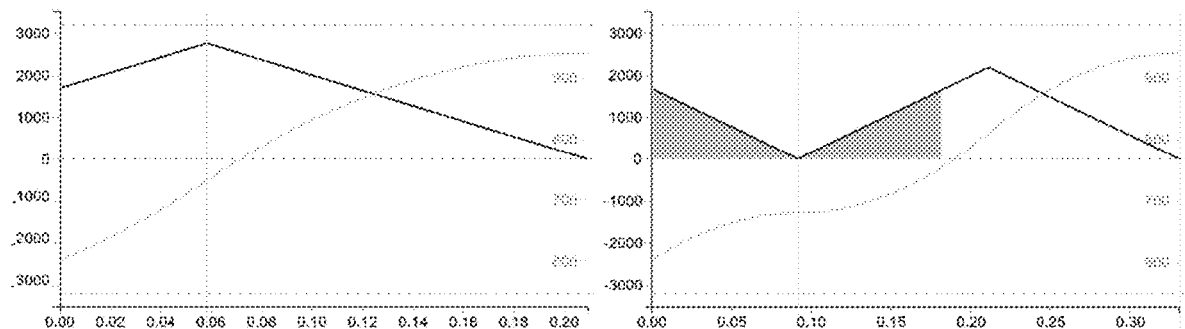
FIGS. 6A-6C show examples of how to lengthen negative profiles for which adding is not possible.

FIG. 6A shows a first example of a negative profile for which adding is not possible. This profile consists of a two-phase tail. To lengthen the profile, a negative line to zero is introduced in the head, and the tail area is reduced accordingly. Thus, area is shifted from the tail to the head.

Figure 6B:
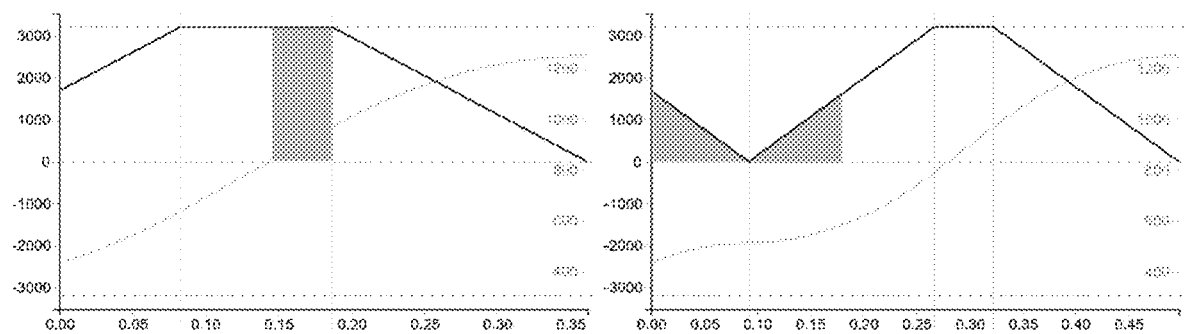
Figure 6C:
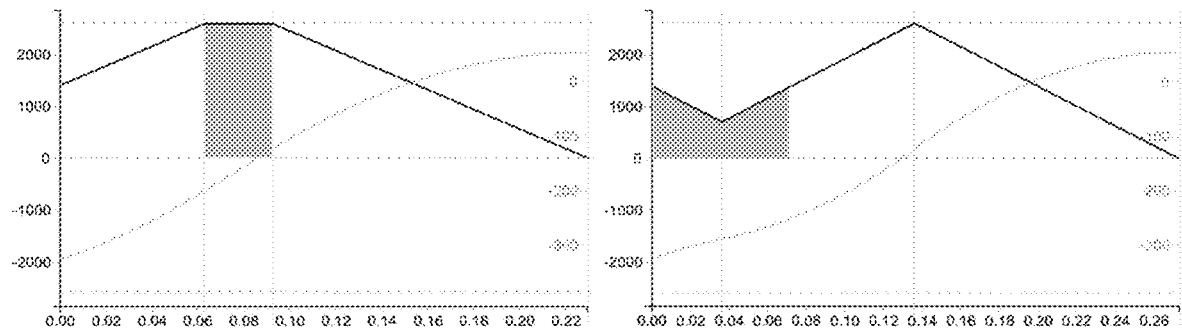

FIGS. 6B and 6C show second and third examples of negative profiles for which adding is not possible. These profiles consist of a three-phase tail. If the area introduced by adding a negative line to zero is less than the rectangular area under the constant-acceleration sixth phase, then we reduce the rectangular area. An example of this is shown in FIG. 6B. On the other hand, if the area introduced by adding a negative line to zero is greater than the rectangular area of the sixth phase, then we remove the rectangular area completely, as illustrated in FIG. 6C. This is then treated as a NegOnePosTwo as illustrated in FIG. 6A (the line will be taken to zero in the head portion and the tail portion will be reduced).

Figure 7A:
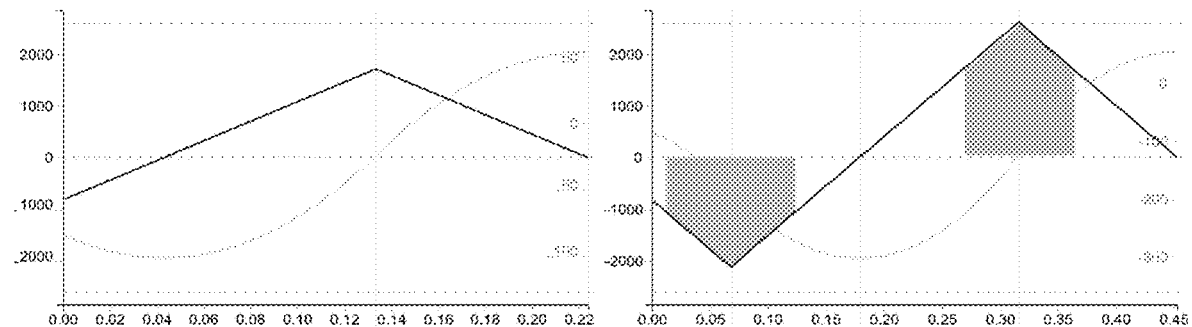
FIGS. 7A-7C show examples of how to lengthen negative profiles for which adding is possible.

FIG. 7A shows a first example of a negative profile for which adding is possible. This profile consists of a one-phase negative head (only the $3^{rd}$ phase has non-zero duration) and a two-phase positive tail. Here, the head and the tail are lengthened until one of them reaches the respective acceleration limit.

Figure 7B:
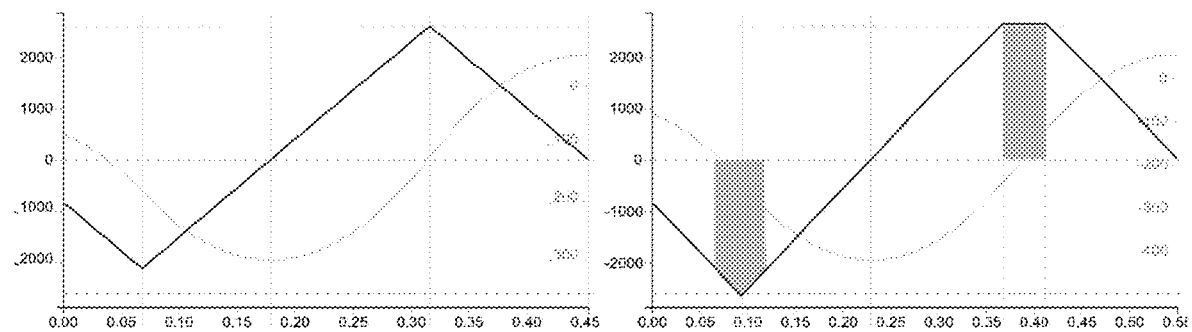

FIG. 7B shows a second example of a negative profile for which adding is possible. This profile consists of a two-phase negative head and a two-phase positive tail. The positive tail reaches the positive acceleration limit. To generate the next profile in the ordered sequence, the length of the head portion is increased until the acceleration reaches the negative acceleration limit, and the rectangular area in the tail is lengthened accordingly.

Figure 7C:
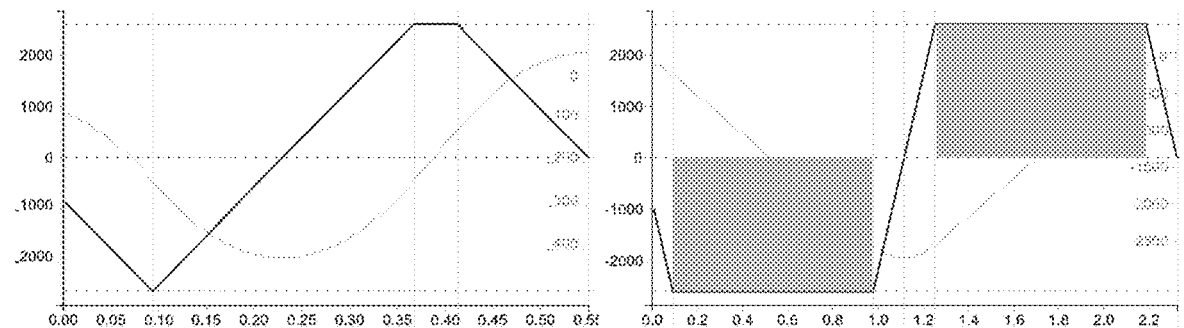

FIG. 7C shows a third example of a negative profile for which adding is possible. This profile consists of a two-phase negative head and a three-phase positive tail. In this case, the rectangular area in the head portion is increased (increasing the rectangular area in the tail portion accordingly) until the negative velocity limit is encountered. This is the maximal negative profile and is therefore the end of the successive modification process.

As can be seen from the above examples, each stage of the modification involves shortening or lengthening the current profile until one or both of the following occurs: (i) the number of phases having nonzero duration decreases or increases; and (ii) a motion constraint (for example, an acceleration limit or velocity limit) is encountered. At each of these transition points, the set of equations describing the motion changes. Hence, a "movement profile" can be understood as a set of phases, parameterised by a travelling time within a certain range, wherein the set of phases is described by a consistent set of equations of motion throughout the range.

The successive modification process in the above example started from the maximal positive profile, was then successively shortened until the minimal profile was reached, and was then successively lengthened until the maximal negative profile was reached. It will be understood that this example could be run in reverse—starting from the maximal negative profile and ending with the maximal positive profile. In other embodiments, two ordered sequences may be defined: one starting from the maximal positive profile and ending with the minimal profile, and the other starting from the maximal negative profile and ending with the minimal profile. It may also be possible to start from the minimal profile and grow the profiles in two ordered sequences—one ending with the maximal positive profile and the other ending with the maximal negative profile. However, for a given starting state, target state, and set of motion constraints, each of these approaches will ultimately produce the same overall set of movement profiles.

Figure 8:
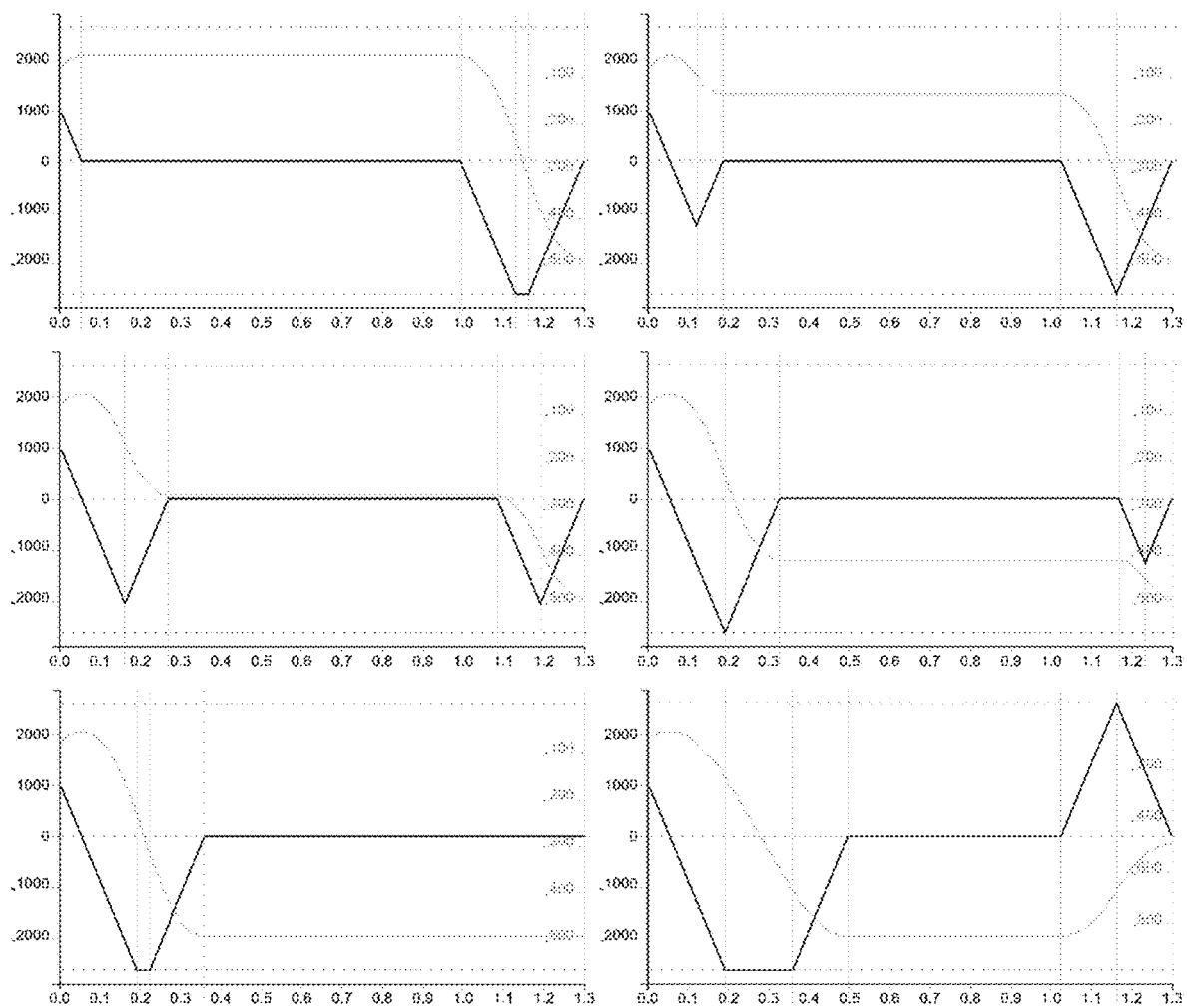
FIG. 8 shows an exemplary sequence of movement profiles for achieving a target state at a specified time.

The rules and examples above are sufficient to provide a complete set of movement profiles when searching for the minimum time solution. When searching for a solution that achieves the target state at a specified time, the same rules apply, but some additional profiles may need to be included. These are "double acceleration" and "double deceleration" profiles. These occur after the (positive) minimal profile, before this profile is flipped to begin the negative profiles. The sequence shown in FIG. 8 gives an example with double profiles added. Reading the sequence from left to right, top to bottom:

1. The first profile is a TailThree (with cruise added).
2. Area is shifted from the rectangular area to the head until the rectangular area is removed completely.
3. The head and tail area are equalised. This is because the solutions to the profile either side of this point are given by different equations (the same equations but with different signs).
4. The head portion is increased until it reaches the negative acceleration limit.
5. A rectangular area is added to the head portion and the tail portion is removed, leading to the opening negative profile.
6. The head area is increased until the negative velocity limit is reached.

Figure 9:
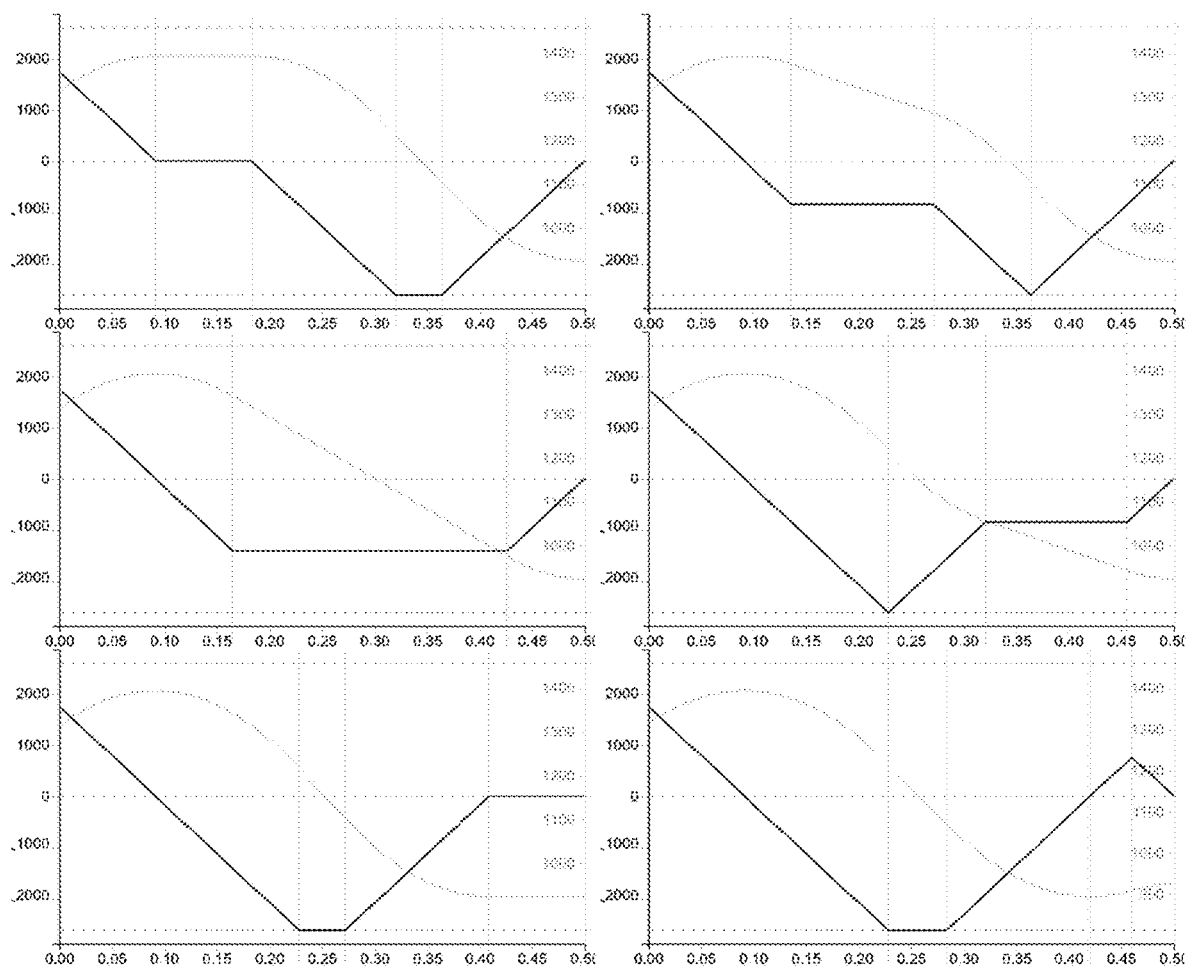
FIG. 9 shows a further exemplary sequence of movement profiles for achieving a target state at a specified time.

There is one notable variation to this sequence, which occurs when the duration of the fourth interval (for the fourth phase) is too short to accommodate the area being shifted from the tail to the head. Notice that in the sequence of FIG. 8, from step 1 to step 2, the fourth interval, t4, is reduced. In some cases, t4 would have to become negative, to allow further area to be shifted from the tail to the head; but this is not possible. The solution is to introduce profiles where acceleration is non-zero in the "cruise", as shown in FIG. 9. The amended sequence is as follows (reading the plots left to right, top to bottom, again):
1. Removing the rectangular area and shifting to the head portion would make t4 negative, so we "bridge" the head and tail portions (allowing a "cruise" at non-zero acceleration, as shown by the linearly decreasing velocity plot)
2. We equalise head and tail portions.
3. We take the head portion to the negative acceleration limit.
4. We remove the tail completely to give the first negative profile.
5. We proceed with the negative descent to the negative velocity limit.

Figure 10:
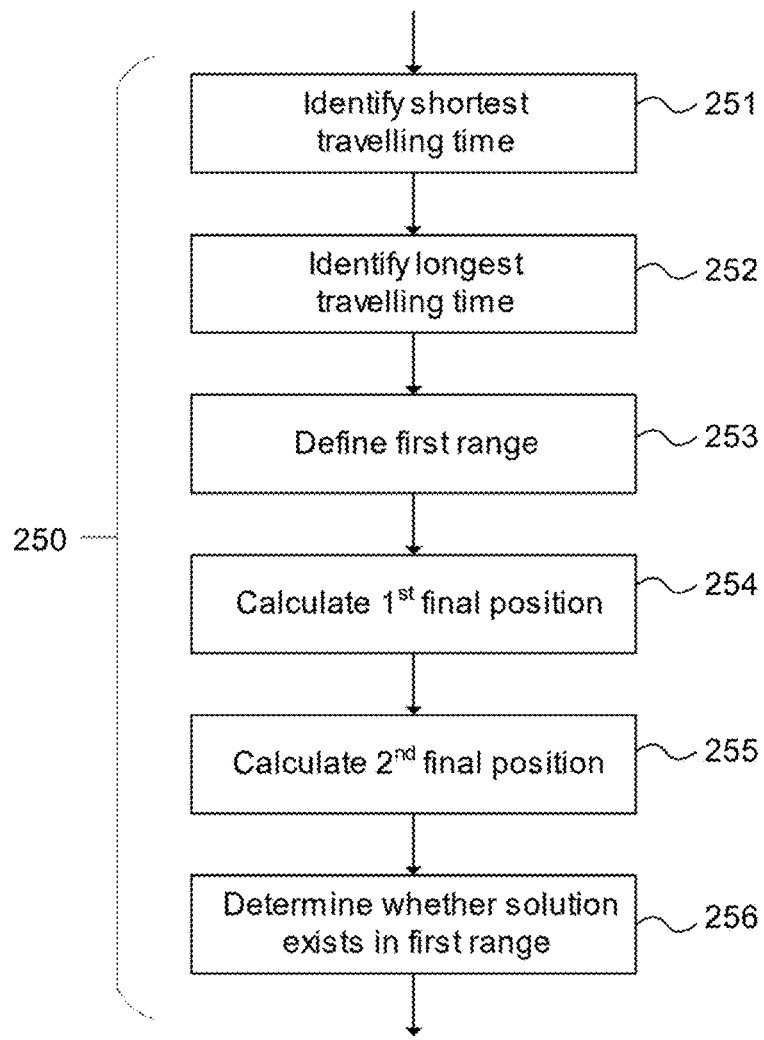
FIG. 10 is a flowchart illustrating one way of evaluating an ordered sequence of movement profiles according to an embodiment.

FIG. 10 illustrates an exemplary procedure for evaluating the ordered sequence of movement profiles. This procedure will typically be repeated for each movement profile in the sequence. In step 251, the processor 106 identifies the shortest travelling time that can be achieved by the current movement profile. In step 252, the processor 106 identifies the longest travelling time that can be achieved by the current movement profile. In step 253, a first range is defined, between the shortest travelling time and the longest travelling time. In step 254, the processor 106 calculates a first final position. This is the final position achieved by the movement profile corresponding to the shortest travelling time. In step 255, the processor calculates a second final position, which is the final position achieved by the movement profile corresponding to the longest travelling time. In step 256, the processor determines whether the movement profile can provide one or more solutions for achieving the target state of motion, within the first range, based on the first final position, the second final position, and the target position.

Figure 11:
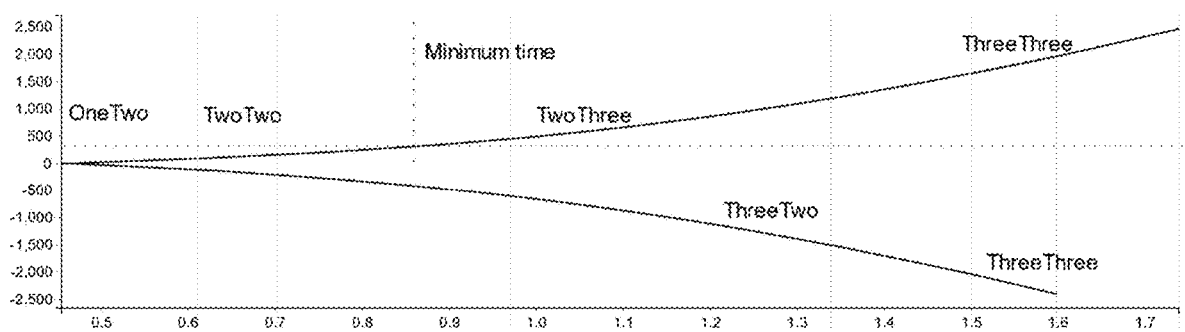
FIG. 11 is an example of final position plotted against travelling time, for a sequence of movement profiles.

The endpoints of the first range can be examined to determine whether the movement profile can provide one or more solutions. For example, if the first final position undershoots the target position and the second final position overshoots the target position, then the respective movement profile provides exactly one solution within the first range. (A "solution" occurs when the final position is the target position.) This can be visualised by drawing a graph of the final position function (the final position as a function of travelling time). An example of this is shown in FIG. 11. Note that generating the full, continuous graph is not an essential step of the trajectory planning method—it is done here merely to assist visualisation and understanding.

Once a range containing a solution has been identified, the equations of motion governing the movement profile are solved in that range, to find the solution. Typically, numerical solving algorithms, such as the Newton-Raphson method, are used to find the solution.

When the target position is static, it is represented by a horizontal line on the graph. The final position function is made up of a set of curves, each curve corresponding to a movement profile, over an associated range of travelling times. With the movement profiles ordered by travelling time, the curves are continuous—the first final position achieved by one movement profile is identical to the second final position achieved by the adjacent movement profile in the sequence. A solution exists wherever the final position function intersects the target position function (which is a horizontal line, for the static case illustrated in FIG. 11).

The present inventors have recognised that it is advantageous to detect local extrema in the final position function, because this can help to localise the solutions and thereby make it easier to find them. When the movement profiles are derived using the successive modification procedure described above, each movement profile can have at most one local extremum. The method proceeds by detecting the local extremum, and splitting the range into two at this point. The two sub-ranges can then be checked to determine whether they contain solutions. The detection of extrema is based on the values of the final position function at the endpoints of the range (that is, the first final position and the second final position), and the gradient of the final position function at these endpoints.

According to one exemplary process, the extrema can be detected as follows:
If the gradient ($1^{st}$ derivative) of the final position function has the same sign at the start and end of the range, no extremum exists in the range. That is, if the gradients at the start and end are both positive or both negative, there is no extremum.
If the first and second final positions undershoot the target position, the first gradient value (corresponding to the shortest travelling time) is negative, and the second gradient value (corresponding to the longest travelling time) is positive, then no solution exists in the range.
Similarly, if the first and second final positions overshoot the target position and first and second gradient values are positive and negative, respectively, then no solution exists in the range.
On the other hand, if the first and second final positions undershoot the target position, and the first and second gradient values are positive and negative, respectively, then a local extremum exists, the extremum should be found, and the range should be split into two sub-ranges at the local extremum.
Similarly, if the first and second final positions overshoot the target position and first and second gradient values are negative and positive, respectively, then a local extremum exists and the range should be split at that extremum.

The sub-ranges can be checked to see if they include a solution in the same manner described above. In essence, this involves checking whether the local extremum in the final position function has crossed to the other side of the target position function (above or below it), compared with the first final position and the second final position.

Figure 12:
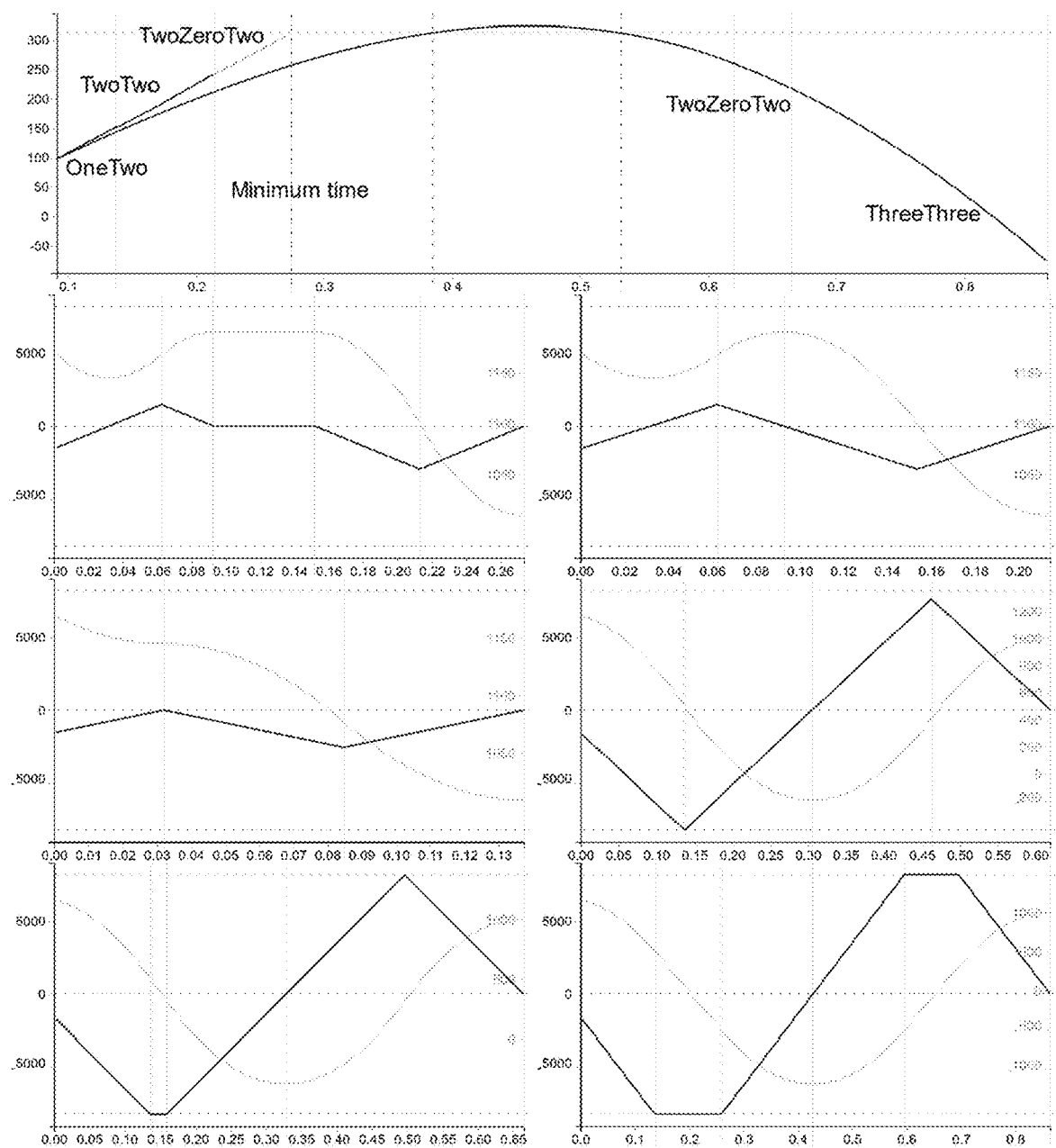
FIG. 12 shows an example of splitting a range.

FIG. 12 shows an example where splitting a range in this way is important. The uppermost plot shows the final position function with respect to time. The six plots below it show the ordered sequence of movement profiles. In this example, the minimum time solution is provided by the first profile (with a cruise). Without checking for local extrema, it is not apparent that there is an inoperative time-period, in which no solutions exist. This is because all later profiles undershoot the target. However, the fourth profile in the sequence (NegTwoPosTwo) in fact contains two solutions—which give the start and end of the inoperable time period.

Figure 13:
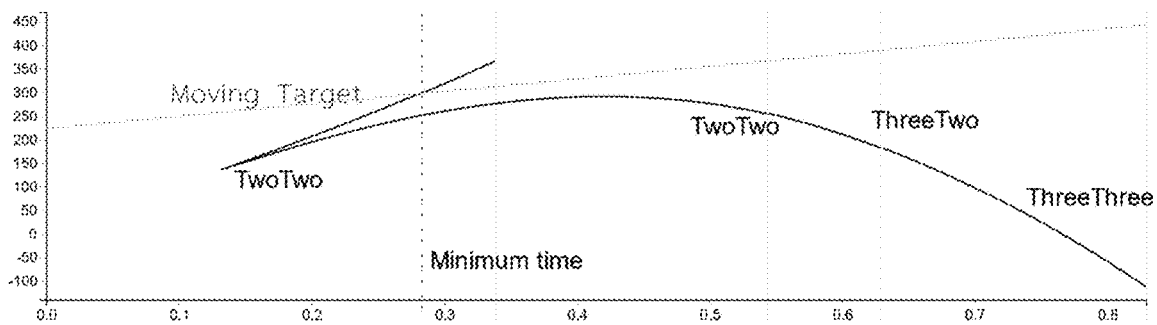
FIG. 13 shows a plot of final position against time, with a dynamic target.

In the examples above, the target position was assumed to be a static position. The goal of the trajectory planning was therefore to reach this fixed position (at the target velocity and target acceleration) in the shortest time possible, or at a specified time. However, the trajectory planning method can also accommodate dynamic targets, wherein the target position is a time-varying function. For example, the target may be moving with a constant velocity. Visually, this can be represented as a sloped target line, as exemplified in FIG. 13.

This broadens the capabilities of the trajectory planning algorithm significantly. The ability to target a moving position has applications in lots of practical scenarios. For example, in robots and industrial machines it may be desirable to electronically gear together a master and a slave object. Applied to gearing, the trajectory-planning algorithm can answer the question "how quickly can the slave gear into the moving master, where the velocity at the time of rendezvous is specified"? If the position of synchronisation with a moving master is also specified, then the time of synchronisation also becomes known, and the question becomes one of achievability: "can the slave gear into the master before it reaches the specified position"? In defence applications, the trajectory-planning algorithm can answer the question "what is the minimum time trajectory" that a chasing craft or missile needs to follow, to match a target object's position and speed.

Note that the trajectory-planning algorithm does not require significant modification to accommodate dynamic targets. Care should be taken when splitting ranges around extrema—the correct point at which to split the range is the point at which the gradient of the final position function matches the gradient (slope) of the moving target. This is also true for the static case, but the static case (unlike the dynamic case) can also work by simply considering the final position function alone, because the target line is horizontal in the static case.

The flowchart of FIG. 10 illustrated one exemplary method of evaluating a set of movement profiles. This method may be preferred and may be particularly advantageous for evaluating an ordered sequence of movement profiles; however, it is not essential to use this method—other evaluation methods are possible. One such alternative evaluation method can be based on the method described below, with reference to FIGS. 14 and 15.

Figure 3:
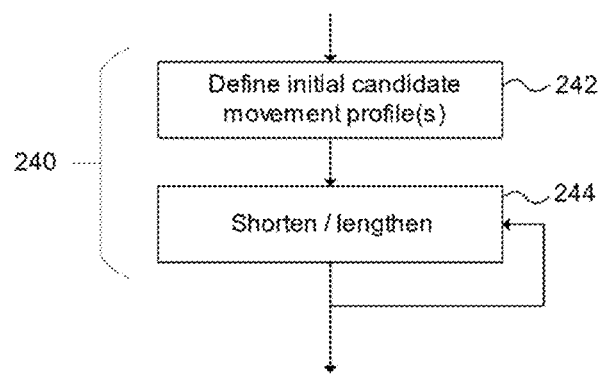
FIG. 3 is a flowchart illustrating one way of obtaining an ordered sequence of movement profiles, according to an embodiment.

The flowchart of FIG. 3 illustrated one exemplary method of obtaining an ordered sequence of movement profiles. This method may be preferred, but other ways of generating an ordered sequence may be adopted in some circumstances.

Figure 14:
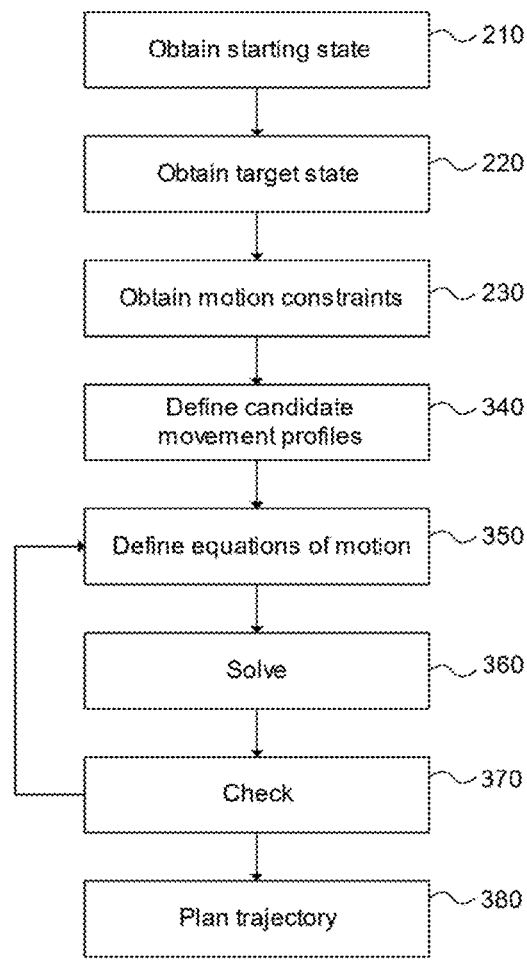
FIG. 14 is a flowchart illustrating another method of planning a trajectory.

FIG. 14 illustrates an alternative method of planning a trajectory. The first three steps 210, 220, 230 of this method are the same as those of the method of FIG. 2. In step 340, the processor 106 defines a plurality of candidate movement profiles, each described by a set of parameters. Steps 350 to 370 are iterated over the plurality of candidate movement profiles. For each candidate profile, a set of equations of motion is defined (step 350). The equations include the starting state and the target state as known variables. The parameters of the candidate profile are unknown variables. In step 360, the set of equations is solved to produce a solution. In step 370, the processor checks whether the solution (that is, the set of parameters found by solving the equations) meets the motion constraints, or if one or more of these constraints has been breached. A solution that meets the motion constraints is a valid solution and can be used to plan a trajectory in step 380.

An example of this method will now be described in greater detail.

The method works by selecting the valid motion profile from the set of candidate motion profiles, by repeatedly applying constraints to the system of equations that describe the trajectory and solving to yield a set of all possible solutions. The set of solutions is then analysed to select the single profile that has positive time intervals for all phases and does not break the desired the motion constraints. This method is effective for all orders of trajectories: including, order 2 (limited in acceleration), and order 3 (limited in jerk) and so on. It is capable of finding the correct solution for any given the starting state and target state. In particular, the velocity and acceleration at the start and end positions may be non-zero. I way of example only, the description below will focus on the third order case, with a target acceleration of zero, and seeking to find the minimum time solution.

A trajectory is the relationship between two elements of different domains: time and space. Trajectories have different constraints that must be satisfied on the differentials of position (velocity, acceleration, jerk, snap, crackle, etc.) according to the order of the trajectory. The order defines the "smoothness" of the resulting motion. Hence, a third order trajectory of an object describes the evolution of its position, velocity, acceleration and jerk over time, where limits are specified on the maximal amounts of velocity, acceleration and jerk (in addition to the starting and end boundary conditions). A minimum time trajectory is one that transfers an object between two states of motion, respecting constraints on velocity, v, acceleration, a, and jerk, j, in the shortest possible time.

Pontryagin (1956) did the basic research that explains the origins of time optimal trajectories. The so-called Pontryagin's maximum (or minimum) principle states that extreme control inputs minimize the time to drive a dynamic system from one state to another. If we apply the Pontryagin maximum principle to the minimum time trajectory of an object, we drive each constraint to its maximum ($j \rightarrow j_{max}$ or $j_{min}$, $a \rightarrow a_{max}$ or $a_{min}$ and $v \rightarrow v_{max}$ or $v_{min}$). The "longest" third order trajectory will have three portions: an acceleration portion, a maximum velocity portion (constant velocity) and a deceleration portion. Hence, there will be 7 switching times and seven phases to the trajectory. "Shorter" trajectories are possible, using fewer phases, for example when the distance to be covered is short and maximum velocity is never reached. A similar approach can be applied to second order trajectories with three phases and fourth order trajectories with fifteen phases.

We can decompose any trajectory into an n sized set of small time slices denoted $t_n$; then a set of three differential equations record the state of the motion at the end of the time slice. These are the basic relationships between speed, distance, time and acceleration "discovered" by Rene Descartes, Isaac Newton, Gottfried Leibniz, et al.

$$a_n = a_{n-1} + \int_0^{t_n} j_n \, dt, \quad (1)$$

$$v_n = v_{n-1} + \int_0^{t_n} a_n \, dt, \quad (2)$$

$$p_n = p_{n-1} + \int_0^{t_n} v_n \, dt, \quad (3)$$

The trajectory (position versus time) for our minimum time trajectory is not a single continuous polynomial (for example a Hermite curve), but a series of piecewise polynomials that connect across the 7 phases. Hence, we can take the set of n polynomials and concatenate them at our switching times $t_1$, $t_2$, $t_3$, $t_4$, $t_5$, $t_6$, $t_7$, to compose the overall trajectory for an object as it evolves over time. For our minimum time trajectory, because the value of acceleration/deceleration is constant during the acceleration and deceleration phases, we can use the basic equations of motion across the acceleration, velocity and position domains to relate the switching times to the values of acceleration, velocity and position at these times. First acceleration:

$$a_1 = a_0 + t_1 \cdot j_{max}, \quad (4)$$

$$a_2 = a_1 + t_2 \cdot 0, \quad (5)$$

$$a_3 = a_2 + t_3 \cdot j_{min}, \quad (6)$$

$$a_4 = a_3 + t_4 \cdot 0, \quad (7)$$

$$a_5 = a_4 + t_5 \cdot j_{min} \quad (8)$$

$$a_6 = a_5 + t_6 \cdot 0 \tag{9}$$

$$a_7 = a_6 + t_7 \cdot j_{max}, \tag{10}$$

Then velocity:

$$v_1 = v_0 + t_1 \cdot a_0 + \tfrac{1}{2} \cdot t_1^2 \cdot j_{max}, \tag{11}$$

$$v_2 = v_1 + t_2 \cdot a_1 + \tfrac{1}{2} \cdot t_2^2 \cdot 0, \tag{12}$$

$$v_3 = v_2 + t_3 \cdot a_2 + \tfrac{1}{2} \cdot t_3^2 \cdot j_{min}, \tag{13}$$

$$v_4 = v_3 + t_4 \cdot a_3 + \tfrac{1}{2} \cdot t_4^2 \cdot 0, \tag{14}$$

$$v_5 = v_4 + t_5 \cdot a_4 + \tfrac{1}{2} \cdot t_5^2 \cdot j_{min}, \tag{15}$$

$$v_6 = v_5 + t_6 \cdot a_5 + \tfrac{1}{2} \cdot t_6^2 \cdot 0, \tag{16}$$

$$v_7 = v_6 + t_7 \cdot a_6 + \tfrac{1}{2} \cdot t_7^2 \cdot j_{max}, \tag{17}$$

And finally position:

$$p_1 = p_0 + t_1 \cdot v_0 + \tfrac{1}{2} \cdot t_1^2 \cdot a_0 + \tfrac{1}{6} \cdot t_1^3 \cdot j_{max}, \tag{18}$$

$$p_2 = p_1 + t_2 \cdot v_1 + \tfrac{1}{2} \cdot t_2^2 \cdot a_1 + \tfrac{1}{6} \cdot t_2^3 \cdot 0, \tag{19}$$

$$p_3 = p_2 + t_3 \cdot v_2 + \tfrac{1}{2} \cdot t_3^2 \cdot a_2 + \tfrac{1}{6} \cdot t_3^3 \cdot j_{min}, \tag{20}$$

$$p_4 = p_3 + t_4 \cdot v_3 + \tfrac{1}{2} \cdot t_4^2 \cdot a_3 + \tfrac{1}{6} \cdot t_4^3 \cdot 0, \tag{21}$$

$$p_5 = p_4 + t_5 \cdot v_4 + \tfrac{1}{2} \cdot t_5^2 \cdot a_4 + \tfrac{1}{6} \cdot t_5^3 \cdot j_{min}, \tag{22}$$

$$p_6 = p_5 + t_6 \cdot v_5 + \tfrac{1}{2} \cdot t_6^2 \cdot a_5 + \tfrac{1}{6} \cdot t_6^3 \cdot 0, \tag{23}$$

$$p_7 = p_6 + t_7 \cdot v_6 + \tfrac{1}{2} \cdot t_7^2 \cdot a_6 + \tfrac{1}{6} \cdot t_7^3 \cdot j_{max} \tag{24}$$

This is a set of 21 equations containing 31 unknown variables. The unknowns represent the state of the trajectory at the transitions between the seven phases of the jerk-limited trajectory at the times each of the seven phases begin. The unknown variables are:

($t_1$, $t_2$, $t_3$, $t_4$, $t_5$, $t_6$, $t_7$)
($a_0$, $a_1$, $a_2$, $a_3$, $a_4$, $a_5$, $a_6$, $a_7$)
($v_0$, $v_1$, $v_2$, $v_3$, $v_4$, $v_5$, $v_6$, $v_7$)
($p_0$, $p_1$, $p_2$, $p_3$, $p_4$, $p_5$, $p_6$, $p_7$)

$p_0$, $a_0$ and $v_0$ become knowns as they are the initial conditions (starting state). $p_{start}$, $a_{start}$, $v_{start}$ and $p_7$, $a_7$ and $v_7$ become our final conditions (target state) with $p_{wayp}$, $v_{wayp}$ and $a_7 = a_{wayp} = 0$. So, we now have 21 equations and 25 unknowns. Four additional constraints need to be applied to this system of equations to be able to solve it and assuming $t_1$ to $t_7$ are non-zero, it describes a full seven phase motion profile a "ThreeZeroThree".

In addition to this motion profile, there are other possible motion profiles but with fewer than 7 phases or with different signs for jerk across the phases that can possibly transfer the motion of the object between the starting and target states in minimum time. Which one is the correct one depends on the values of the starting and ending conditions and the values of the constraints.

Different phase numbers can be present or absent, but the trajectory must be continuous and it must follow the Pontryagin maximum principle—with jerk in phases 2, 4 & 6 being zero and the sign of jerk in phases 1, 3, 5 & 7 following a pattern of alternating signs. Suitable constraints must be added to make a soluble set of simultaneous equations. All valid combinations of phases must be considered during the repeated solving, but only one will yield a valid profile that transfers the state of motion. For example, for a trajectory with no phase 4, we set the constraints listed in Equations 25, 26, 27. These provide the additional constraints needed to be able to solve the system of simultaneous equations.

$$a_2 = -a_5 = a_{max} \tag{26}$$

$$a_3 = 0 \tag{26}$$

$$t_4 = 0 \tag{27}$$

Figure 15:
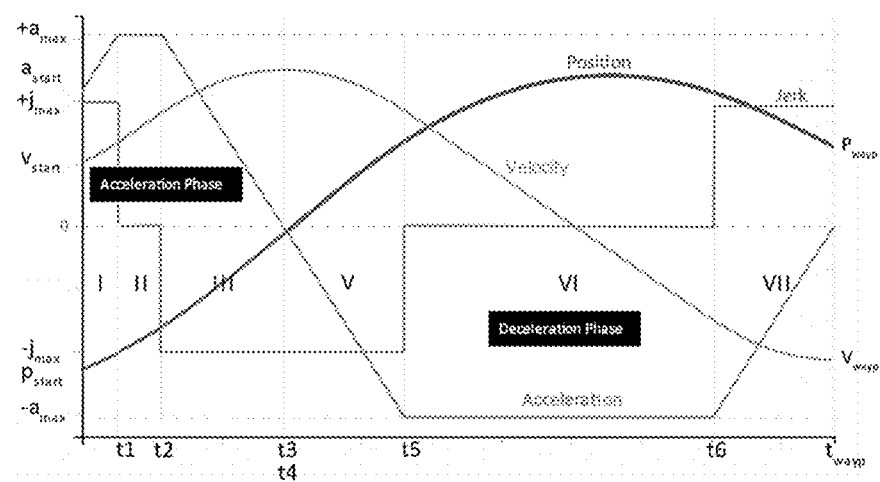
FIG. 15 illustrates an example of a "ThreeThree" movement profile.

This yields a set of soluble equations for the "ThreeThree" movement profile (PosThreeNegThree) shown in FIG. 15. Eliminating and solving the equations in the domain of Real numbers will yield a set of values for the parameters shown in Equations 28-31.

$$(t_1, t_2, t_3, t_4=0, t_5, t_6, t_7=, t_{wayp}) \tag{28}$$

$$(a_0 = a_{start}, a_1 = a_{max}, a_2 = a_{max}, a_3 = 0, a_4 = 0, a_5 = -a_{max}, a_6 = a_{max}, a_7 = 0) \tag{29}$$

$$(v_i = v_{start}, v_1 = \text{eliminate}, v_2 = \text{eliminate}, v_3, v_4 = \text{eliminate}, v_5, v_6 = \text{eliminate}, v_7 = v_{wayp}) \tag{30}$$

$$(p_0 = p_{start}, p_1 = \text{eliminate}, p_2 = \text{eliminate}, p_3 = \text{eliminate}, p_4 = \text{eliminate}, p_5 = \text{eliminate}, p_6 = \text{eliminate}, p_7 = p_{wayp}) \tag{31}$$

For example, when the start and end conditions for the trajectory: $a_{max} \to 5998$, $j_{max} \to 330$, $v_{max} \to 6387$, $a_{start} \to 1880$, $v_{start} \to 54$, $p_{wayp} \to 370$ and $v_{wayp} \to 175$ are applied, we get the results shown in the table below. Here a single system of equations yields two solutions, only one is shown here.

| | |
|---|---|
| $t_1 \to 12.47$ | $t_6 \to -36.63$ |
| $t_2 \to -35.72$ | $t_7 \to 18.17$ |
| $t_3 \to 18.17$ | $t_{wayp} \to -5.35$ |
| $t_4 \to 0$ | $v_3 \to -110565.88$ |
| $t_5 \to 18.17$ | $v_5 \to -165074.98$ |

We can discount the PosThreeNegThree profile as being the correct one single profile that transfers the state of motion between the given starting and ending conditions, because $t_2$ is a negative number (and $t_6$ is negative, and $v_3$ and $v_5$ exceed $a_{max}$, and $t_{wayp}$ is negative). If we repeat the exercise for the system of equations where phases 4, 2, and 6 have zero duration (in the form of a NegTwoPosTwo profile), and apply $a_3 = 0$ as a condition, this yields the results shown in the following table.

| | | |
|---|---|---|
| $a_2 \to -1885.62$ | $t_3 \to 5.71$ | $t_7 \to 4.09$ |
| $a_5 \to 1352.15$ | $t_4 \to 0$ | $t_{wayp} \to 25.32$ |
| $t_1 \to 11.411$ | $t_5 \to 4.0$ | $v_3 \to -5365.31$ |
| $t_2 \to 0$ | $t_6 \to 0$ | $v_5 \to -2595.16$ |

Here, we can see that no times are negative and the velocities at $v_3$ and $v_5$ do not exceed $v_{max}$ and this movement profile (NegTwoPosTwo) is the correct and only profile for these starting end ending conditions and is the minimum possible time to transfer the motion between the two states. The minimum time is 25.32 seconds. We can then use the values for $t_1$ to $t_6$ in equations 18-24 to plot the position of the object versus time—in other words, we have planned the trajectory.

Although this is potentially computationally intensive, this provides a process whereby, through the repeated solving of systems of equations and discarding results where switching times are negative, constraints have been breached or the time is not the minimum time, we can identify the single motion profile that transfers an object between two states of motion in the minimum time. This method is easily extensible into higher order trajectories and fixed-time-lowest-energy trajectories.

It will be understood that the movement profiles to test in this way could be generated by the process of successive modification described previously above. However, this is not essential. In principle, a list of candidate profiles could be generated or obtained in any way. In some cases, the list of candidate profiles could be exhaustive—that is, the candidate profiles could include every possible permutation of phases (given the requirement for the acceleration function to be continuous, and respecting the Pontryagin maximum principle). This will ensure that the correct movement profile is always included in the list of candidates, and can help to minimise the effort involved in generating the list of candidate profiles to test.

It should be noted that the above-mentioned embodiments illustrate rather than limit the invention, and that those skilled in the art will be able to design many alternative embodiments without departing from the scope of the appended claims. In particular, although the examples above have focused on the application of trajectory-planning methods to robotics, the methods described can be applied in any scenario in which it is desired to calculate/plan a trajectory for any object that is capable of controlled movement. The object could be a vehicle (for example, an autonomous vehicle such as a driverless automobile or unmanned aircraft), an elevator cab (also called a "carriage" or "car"), a train, or a missile, for example. The object may be self-propelled or moved by an external actuator. The trajectory planning functions may be performed on board the object or externally.

In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The embodiments may be implemented by means of hardware comprising several distinct elements. In a device claim enumerating several means, several of these means may be embodied by one and the same item of hardware. The mere fact that certain measures are recited in mutually different dependent claims does not indicate that a combination of these measures cannot be used to advantage. Furthermore in the appended claims lists comprising "at least one of: A; B; and C" should be interpreted as (A and/or B) and/or C.

Furthermore in general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although these are not limiting examples. While various aspects described herein may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments described herein may be implemented by computer software executable by a data processor of the apparatus, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD, etc.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments as discussed herein may be practiced in various components such as integrated circuit modules. The design of integrated circuits is by and large a highly automated process. Complex and powerful software tools are available for converting a logic level design into a semiconductor circuit design ready to be etched and formed on a semiconductor substrate. Programs, such as those provided by Synopsys, Inc. of Mountain View, Calif. and Cadence Design, of San Jose, Calif. automatically route conductors and locate components on a semiconductor chip using well-established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The invention claimed is:

1. A computer program product comprising a non-transitory computer-readable medium having embodied thereon a computer program comprising computer program code that when executed on a computer causes the computer to plan a trajectory for an object that is capable of controlled movement in one or more degrees of freedom, planning of the trajectory comprising:
   obtaining (210) a starting state of motion of the object;
   obtaining (220) a target state of motion for the object;
   obtaining (230) one or more motion constraints;
   obtaining (240) at least one ordered sequence of movement profiles,
   wherein the at least one ordered sequence of movement profiles includes:
      (i) movement profiles that end with a phase of increasing acceleration and
      (ii) movement profiles that end with a phase of decreasing acceleration;
   evaluating (250) the at least one ordered sequence of movement profiles to determine whether they can achieve the target state of motion;
   selecting (260) a movement profile according to the result of the evaluating; and
   planning (270) the trajectory for the object based on the selected movement profile,
   wherein obtaining the at least one ordered sequence of movement profiles comprises:
   defining (242) one or more initial candidate movement profiles, based on a difference between the starting state of motion and the target state of motion, and based on the one or more motion constraints, and starting with the one or more initial candidate movement profiles, generating the at least one ordered sequence by successive modification (244), wherein each movement profile consists of a plurality of phases, wherein the successive modification comprises a series of stages, and wherein each stage comprises shortening or lengthening (244) the current movement profile, while ensuring that the target velocity is achieved, until one or both of the following occurs:

one of the one or more motion constraints is encountered; and the number of phases that have nonzero duration changes.

2. The computer program product of claim 1, wherein the evaluating comprises:

identifying the minimum amount of time in which it is possible to achieve the target state of motion, and identifying the movement profile that achieves this; and/or identifying the start and end of a range of times in which it is impossible to achieve the target state of motion, and identifying the one or more movement profiles associated with this range of times.

3. The computer program product of claim 1, wherein:
the starting state of motion includes a starting velocity;
the target state of motion includes a target velocity;
the one or more motion constraints include a positive velocity limit; and
the one or more initial candidate movement profiles comprise a maximal positive movement profile that takes a velocity of the object from the starting velocity to the positive velocity limit and then reduces it to the target velocity.

4. The computer program product of claim 1, wherein:
the starting state of motion includes a starting velocity;
the target state of motion includes a target velocity;
the one or more motion constraints include a negative velocity limit; and
the one or more initial candidate movement profiles comprise a maximal negative movement profile that takes a velocity of the object from the starting velocity to the negative velocity limit and then increases it to the target velocity.

5. The computer program product of claim 1, wherein:
the starting state of motion includes a starting velocity;
the target state of motion includes a target velocity; and
the one or more initial candidate movement profiles comprise a minimal profile that takes a velocity of the object from the starting velocity to the target velocity in the minimum amount of time.

6. The computer program product of claim 1, wherein the successive modification comprises:

if the current profile includes one or more phases of positive acceleration and one or more phases of negative acceleration, shortening the current profile by shortening the one or more phases of positive acceleration and shortening the one or more phases of negative acceleration; or otherwise, if the current profile consists of a plurality of phases of acceleration having the same sign, shortening the current profile by shortening one or more early phases of acceleration and lengthening one or more late phases of acceleration.

7. The computer program product of claim 1, wherein the successive modification comprises:

if the current profile consists of a plurality of phases of acceleration having the same sign, lengthening the current profile by shortening a late phase of acceleration and lengthening an early phase of acceleration; or otherwise, if the current profile includes one or more phases of positive acceleration and one or more phases of negative acceleration, lengthening the current profile by lengthening the one or more phases of positive acceleration and lengthening the one or more phases of negative acceleration.

8. The computer program product of claim 1, wherein the at least one ordered sequence of movement profiles is ordered by the travelling time that is achieved by each profile.

9. A computer program product comprising a non-transitory computer-readable medium having embodied thereon a computer program comprising computer program code that when executed on a computer causes the computer to plan a trajectory for an object that is capable of controlled movement in one or more degrees of freedom, planning of the trajectory comprising:

obtaining (210) a starting state of motion of the object;
obtaining (220) a target state of motion for the object;
obtaining (230) one or more motion constraints;
obtaining (240) at least one ordered sequence of movement profiles, wherein the at least one ordered sequence of movement profiles includes:
(i) movement profiles that end with a phase of increasing acceleration and
(ii) movement profiles that end with a phase of decreasing acceleration;

evaluating (250) the at least one ordered sequence of movement profiles to determine whether they can achieve the target state of motion;

selecting (260) a movement profile according to the result of the evaluating; and planning (270) the trajectory for the object based on the selected movement profile, wherein the target state of motion includes a target position, and wherein the evaluating comprises, for each movement profile in the at least one ordered sequence:

identifying (251) the shortest travelling time that can be achieved using the movement profile;

identifying (252) the longest travelling time that can be achieved using the movement profile;

defining (253) a first range between the shortest travelling time and the longest travelling time;

calculating (254) a first final position, being the final position achieved by the movement profile corresponding to the shortest travelling time;

calculating (255) a second final position, being the final position achieved by the movement profile corresponding to the longest travelling time; and determining (256) whether the movement profile can provide one or more solutions for achieving the target state of motion, within the first range, based on the first final position, the second final position, and the target position.

10. The computer program product of claim 9, wherein:
the at least one ordered sequence of movement profiles is ordered by travelling time; and the longest travelling time that can be achieved using a given movement profile is equal to the shortest travelling time that can be achieved using the next longer movement profile in the at least one ordered sequence.

11. The computer program product of claim 9, wherein the determining comprises detecting that the first final position undershoots the target position and the second final position overshoots the target position and, in response, identifying that the respective movement profile provides at least one solution within the first range.

12. The computer program product of claim 9, wherein the determining comprises:
   defining a final position function, describing the final position achieved by the movement profile as a function of the travelling time;
   defining a gradient function, based on the gradient of the final position function with respect to travelling time;
   calculating a first gradient value, being the value of the gradient function corresponding to the shortest travelling time;
   calculating a second gradient value, being the value of the gradient function corresponding to the longest travelling time; and
   checking whether the respective movement profile can provide one or more solutions for achieving the target state of motion, based on the first gradient value, the second gradient value, the first final position, the second final position, and the target position.

13. The computer program product of claim 12, wherein the checking comprises detecting an extremum in the final position function,
   the method further comprising, in response to said detecting:
      splitting the first range into a second range and a third range based on the detected extremum; and
      numerically solving the final position function in at least one of: the second range and the third range.

14. A computer program product comprising a non-transitory computer-readable medium having embodied thereon a computer program comprising computer program code that when executed on a computer causes the computer to plan a trajectory for an object that is capable of controlled movement in one or more degrees of freedom, planning of the trajectory comprising:
   obtaining (210) a starting state of motion of the object;
   obtaining (220) a target state of motion for the object;
   obtaining (230) one or more motion constraints;
   obtaining (240) at least one ordered sequence of movement profiles,
   wherein the at least one ordered sequence of movement profiles includes:
      (i) movement profiles that end with a chase of increasing acceleration and
      (ii) movement profiles that end with a phase of decreasing acceleration:
   evaluating (250) the at least one ordered sequence of movement profiles to determine whether they can achieve the target state of motion;
   selecting (260) a movement profile according to the result of the evaluating; and
   planning (270) the trajectory for the object based on the selected movement profile,
   wherein the evaluating comprises identifying a movement profile that achieves the target state of motion at a specified time,
   and wherein the at least one ordered sequence of movement profiles includes a plurality of movement profiles each comprising or consisting of one of the two following sequences of seven phases:
   Sequence A: a first phase of increasing acceleration in a first time interval, a second phase of constant acceleration in a second time interval, a third phase of decreasing acceleration in a third time interval, a fourth phase of constant acceleration in a fourth time interval, a fifth phase of decreasing acceleration in a fifth time interval, a sixth phase of constant acceleration in a sixth time interval, and a seventh phase of increasing acceleration in a seventh time interval; and
   Sequence B: a first phase of decreasing acceleration in a first time interval, a second phase of constant acceleration in a second time interval, a third phase of increasing acceleration in a third time interval, a fourth phase of constant acceleration in a fourth time interval, a fifth phase of increasing acceleration in a fifth time interval, a sixth phase of constant acceleration in a sixth time interval, and a seventh phase of decreasing acceleration in a seventh time interval,
   wherein the acceleration is a piecewise linear function of time and the fourth time interval has nonzero duration.

15. The computer program product of claim 14,
   wherein the at least one ordered sequence of movement profiles additionally comprises a plurality of movement profiles, each comprising or consisting of one of the two following sequences of seven phases:
   Sequence C: a first phase of increasing acceleration in a first time interval, a second phase of constant acceleration in a second time interval, a third phase of decreasing acceleration in a third time interval, a fourth phase of constant acceleration in a fourth time interval, a fifth phase of increasing acceleration in a fifth time interval, a sixth phase of constant acceleration in a sixth time interval, and a seventh phase of decreasing acceleration in a seventh time interval; and
   Sequence D: a first phase of decreasing acceleration in a first time interval, a second phase of constant acceleration in a second time interval, a third phase of increasing acceleration in a third time interval, a fourth phase of constant acceleration in a fourth time interval, a fifth phase of decreasing acceleration in a fifth time interval, a sixth phase of constant acceleration in a sixth time interval, and a seventh phase of increasing acceleration in a seventh time interval,
   wherein the acceleration is a piecewise linear function of time and the fourth time interval has nonzero duration.

16. The computer program product of claim 1, wherein the target state of motion comprises a target position, wherein the target position is a time-varying function.

* * * * *